United States Patent [19]

Yamaguchi

[11] Patent Number: 5,012,438
[45] Date of Patent: Apr. 30, 1991

[54] RECIPROCAL ARITHMETIC CIRCUIT WITH ROM TABLE

[75] Inventor: Akira Yamaguchi, Yokohama, Japan

[73] Assignee: Kabushiki Kaisha Toshiba, Kawasaki, Japan

[21] Appl. No.: 443,357

[22] Filed: Nov. 30, 1989

[30] Foreign Application Priority Data

Dec. 8, 1988 [JP] Japan .................. 63-310707

[51] Int. Cl.$^5$ .................................................. G06F 7/52
[52] U.S. Cl. ............................................................ 364/765
[58] Field of Search ................ 364/765, 745, 729, 761

[56] References Cited

U.S. PATENT DOCUMENTS

| | | | |
|---|---|---|---|
| 3,633,018 | 1/1972 | Ling | 364/765 |
| 3,648,038 | 3/1972 | Sierra | 364/765 |
| 3,777,132 | 12/1973 | Bennett, Jr. | 364/765 |
| 3,917,935 | 11/1975 | Lazecki | 364/761 |
| 4,718,032 | 1/1988 | Irukulla et al. | 364/765 |
| 4,823,301 | 4/1989 | Knierim | 364/761 |

*Primary Examiner*—Dale M. Shaw
*Assistant Examiner*—Tan V. Mai
*Attorney, Agent, or Firm*—Finnegan, Henderson, Farabow, Garrett and Dunner

[57] ABSTRACT

A reciprocal arithmetic circuit for deriving the reciprocal of a divisor A includes a ROM table for converting upper-bit data AH supplied as an address to the approximation of the reciprocal $1/AH^2$ of the square thereof and outputting the same, a subtracter circuit for deriving a difference AH-AL between the upper-bit data AH and the lower-bit data AL of the divisor A, and a multiplier circuit for receiving an output $1/AH^2$ of the read only memory (ROM) table and an output AH-AL of the subtracter circuit and deriving the product $1/AH^2 \cdot (AH-AL)$ thereof to make the output of the ROM table more nearly equal to the reciprocal $1/A$ of the divisor A.

12 Claims, 20 Drawing Sheets

| INPUT/OUTPUT BIT WIDTH OF ROM | ROM SIZE | LOWEST POSSIBLE LOOP NUMBER N |
|---|---|---|
| 2 | 8 | 3 |
| 4 | 64 | 2 |
| 6 | 384 | 2 |
| 8 | 2K (256×8) | 1 |
| 10 | 10K | 1 |
| 12 | 48K | 1 |
| 14 | 224K | 1 |
| 16 | 1M | 1 |

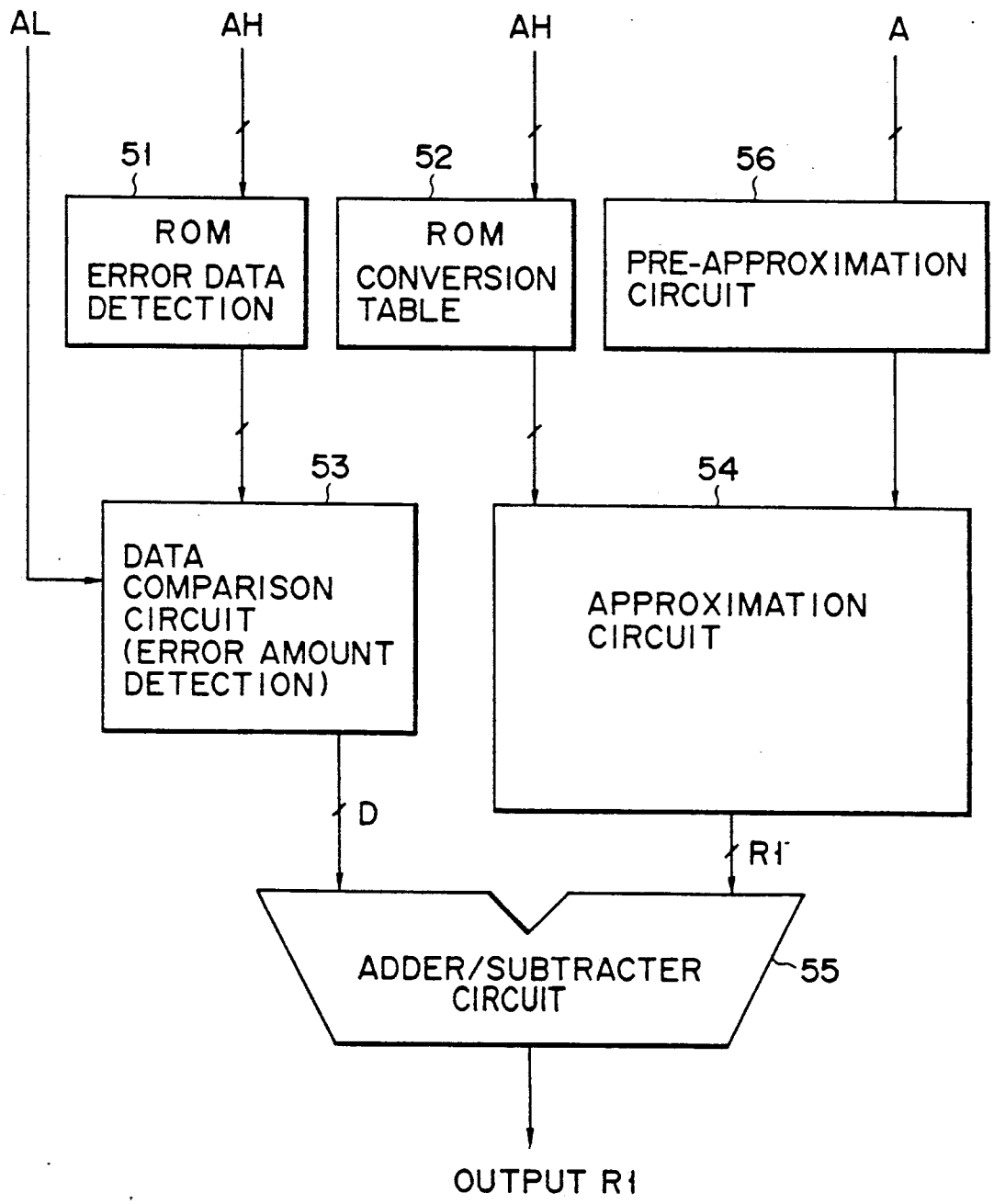
F I G. 14

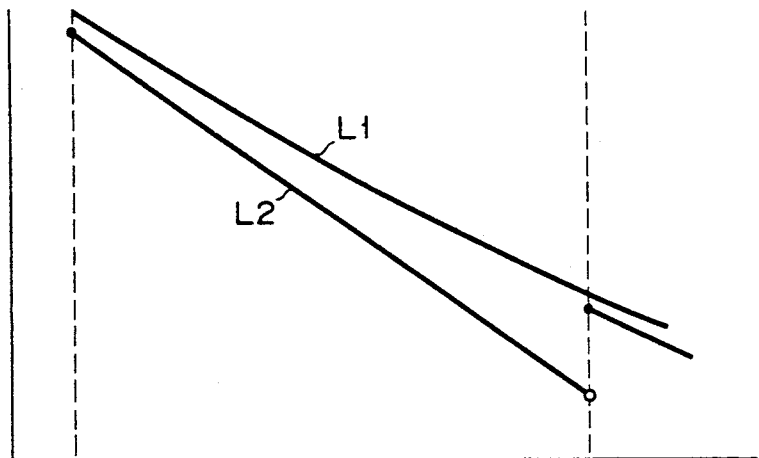
FIG.17A
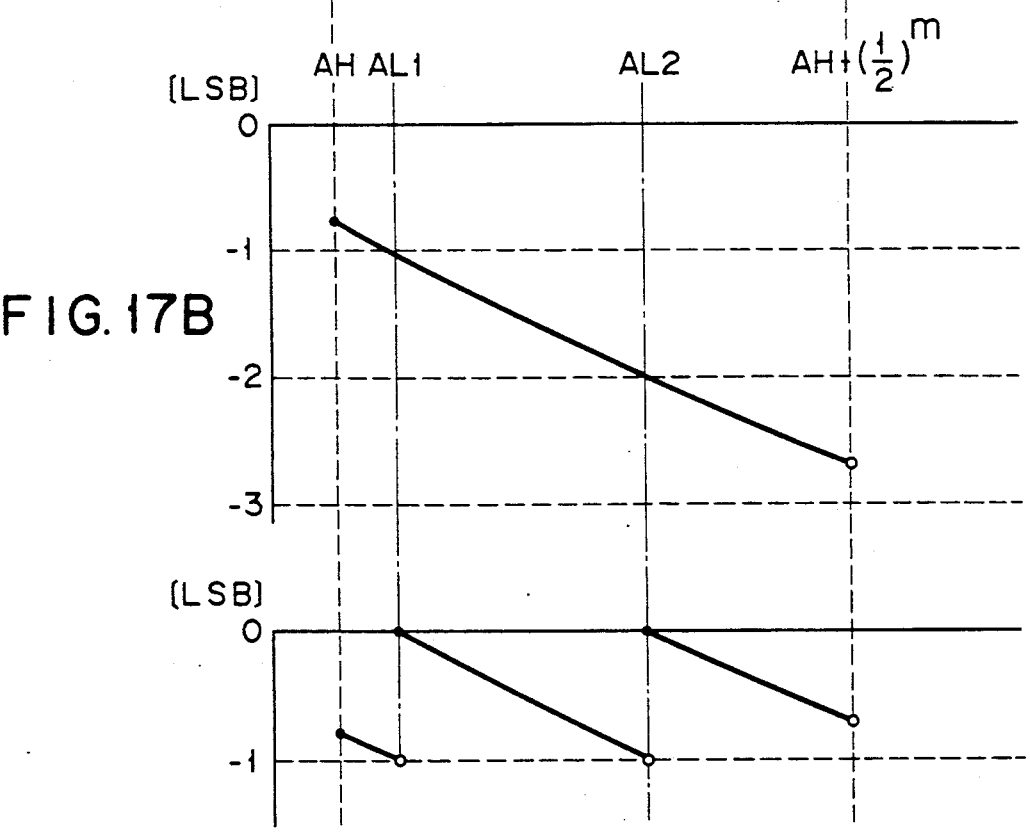
FIG.17B
FIG.17C

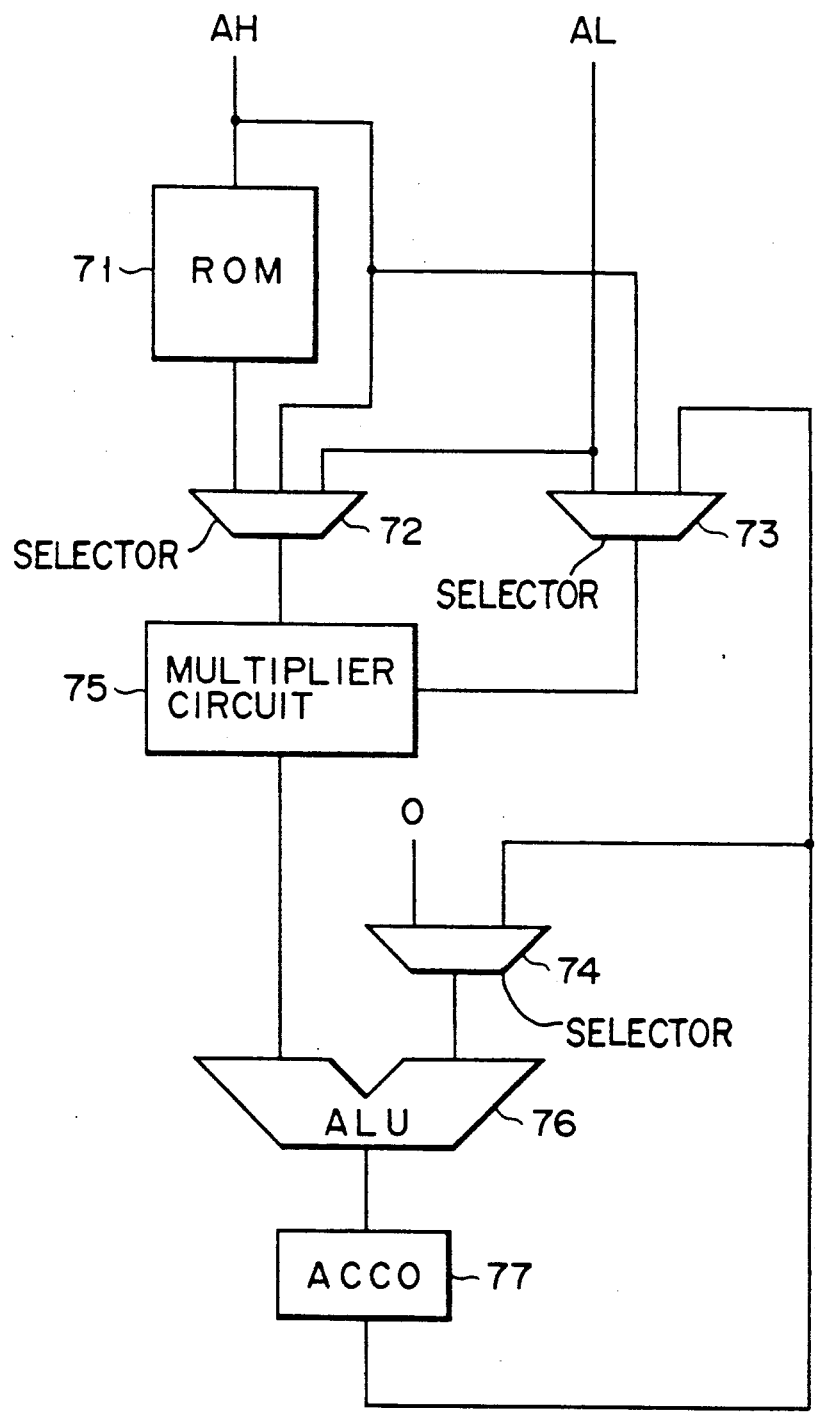
F I G. 19

| n | CONVENTIONAL CIRCUIT (m) | | (m) THIS INVENTION |
|---|---|---|---|
| | FULL-BIT SYSTEM | NEWTON'S METHOD | |
| 8 | 8 | 4 | 3 |
| 16 | 16 | 8 | 6 |
| 24 | 24 | 12 | 8 |
| 32 | 32 | 16 | 11 |

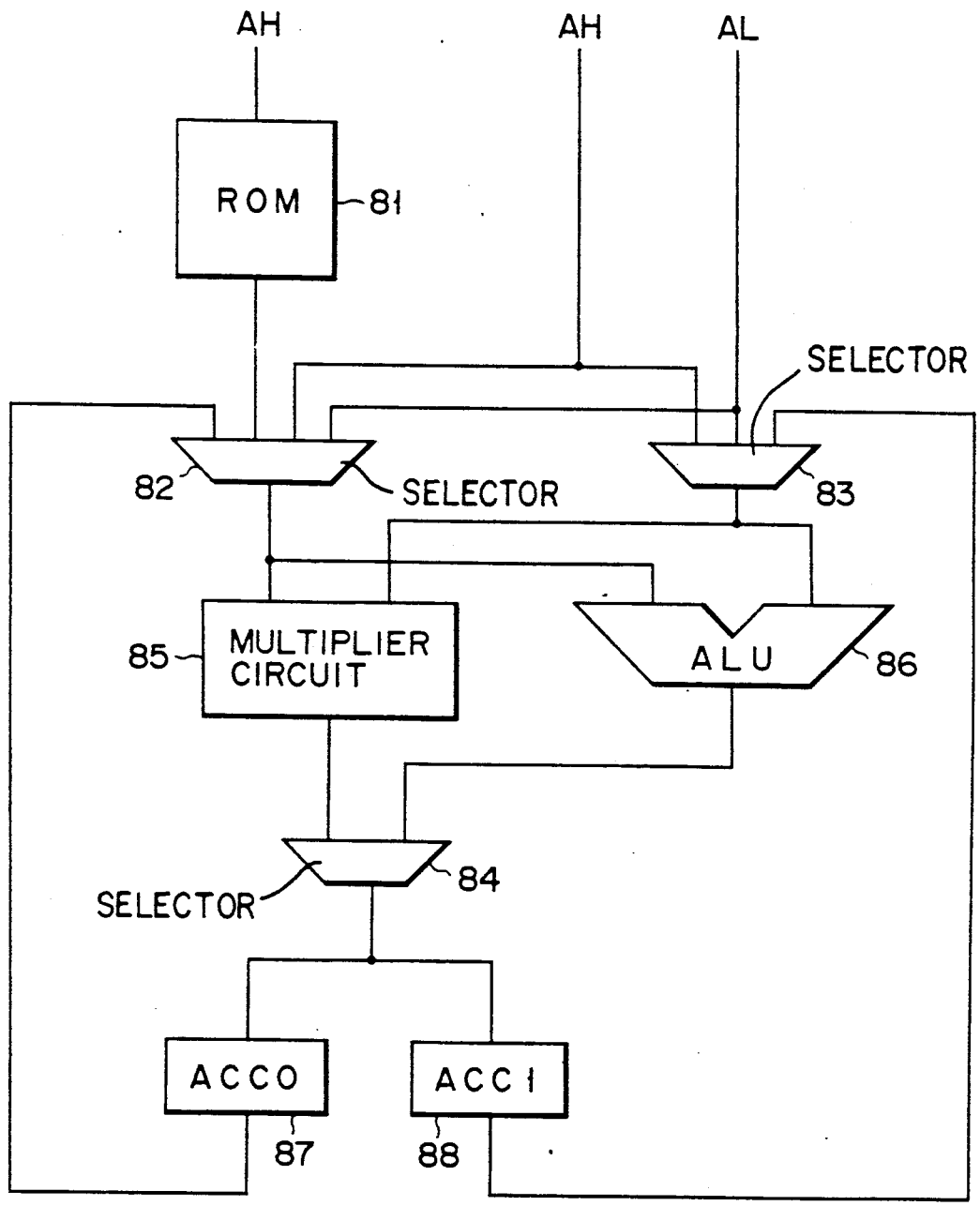
F I G. 22

| n | CONVENTIONAL CIRCUIT (m) | | (m) THIS INVENTION |
|---|---|---|---|
| | FULL-BIT SYSTEM | NEWTON'S METHOD | |
| 8 | 8 | 4 | 2 |
| 16 | 16 | 8 | 4 |
| 24 | 24 | 12 | 6 |
| 32 | 32 | 16 | 8 |

RECIPROCAL ARITHMETIC CIRCUIT WITH ROM TABLE

BACKGROUND OF THE INVENTION

1. Field of the Invention

This invention relates to a reciprocal arithmetic circuit for deriving a reciprocal 1/A of a divisor A, and more particularly to a reciprocal arithmetic circuit used in a divider circuit.

2. Description of the Related Art

In general, a division B/A is calculated by multiplying the reciprocal 1/A of a divisor A by a dividend B. A typical example for a divider circuit of performing the division B/A is shown in FIG. 1. In FIG. 1, 1 denotes a conversion table for converting the divisor A into the reciprocal 1/A and the conversion table is constituted by a read only memory (ROM). In FIG. 1, 2 denotes a multiplier circuit.

All the bits of the divisor A are supplied as an address signal to the conversion table 1 and reciprocal table information stored in the conversion table 1 is searched for according to the address signal. However, in the all-bit or full-bit method in which all the bits of the divisor A are used, it is necessary for the ROM constituting the conversion table to have an extremely large memory capacity. For example, when the divisor A is of 16 bits and the reciprocal 1/A is expressed by 16 bits, the memory capacity of the ROM must be $2^{16}$ words or $2^{16} \times 16 = 1$ Mbits. In this way, in the full-bit method in which the reciprocal 1/A is derived by use of all the bits of the divisor A, a large ROM memory capacity is necessary, increasing the cost of a LSI circuit in which the divider circuit is integrated.

In general, an approximation arithmetic method using Newton's method is used as an arithmetic method of deriving the reciprocal 1/A with a small ROM memory capacity.

In the above approximation arithmetic method, upper-digit bits AH of the divisor A are first input as an address signal to the conversion table and table information of the conversion table is searched for according to the address signal. As a result, the primary approximate reciprocal 1/AH of the divisor A can be derived. Next, the primary approximate reciprocal 1/AH is subjected to the approximation process of Newton's method to derive the secondary approximate reciprocal which is more precise than the primary approximate reciprocal.

Now, the approximate calculation according to Newton's method is explained. FIG. 2 is a flowchart showing the approximate calculation according to Newton's method.

First, upper m-bit data AH of the divisor A are used as an address signal to search for table information in the ROM, thus deriving the primary approximate reciprocal R0=1/AH (steps S1 to S3). Then, the secondary approximate reciprocal R1 is derived by use of the following approximate equation (steps S4 and S5):

$$R1 = R0 \cdot (2 - A \cdot R0) \quad (1)$$

Further, R1 is used instead of R0 in Eq. (1) to calculate the same. As the calculation process is repeatedly effected, the secondary approximate reciprocal R1 approaches the reciprocal 1/A of A. A counter C counts the number of calculations, and the calculation of Eq. (1) is repeatedly effected until the count of the counter C reaches a preset loop number N. Therefore, the secondary approximate reciprocal R1 becomes more nearly equal to the reciprocal 1/A of the divisor A as the loop number N becomes larger.

FIG. 3 shows the relation between the bit number m of the upper-bit data AH, the size of the ROM constituting the conversion table and the loop number N in a case where the full-bit number of the divisor A is set to 16 bits.

As is clearly understood from FIG. 3, the ROM size becomes smaller as the bit number m of the upper-bit data AH becomes smaller. In contrast, an error in the primary approximate reciprocal R0 becomes larger as the bit number m of the upper-bit data AH becomes smaller, thereby making it necessary to increase the loop number N.

The approximate equation by Newton's method shown in Eq. (1) includes two multiplications. Therefore, in the approximate equation by Newton's method, it is necessary to effect multiplications of a number twice the loop number N. Since the multiplication is effected by repeatedly effecting additions, it takes a long time to effect the multiplication. Therefore, in the Newton's method, there occurs a problem that the loop number N becomes larger if the ROM size is reduced, and as a result time required for effecting the approximate calculation becomes larger.

SUMMARY OF THE INVENTION

An object of this invention is to provide a reciprocal arithmetic circuit in which a high-speed and highly precise reciprocal calculation can be effected and the hardware construction can be made simple.

According to this invention, there is provided a reciprocal arithmetic circuit comprising conversion table means storing approximate information items corresponding to the reCiprocals $[(1/AH)^2]$ of the square of upper-bit data AH of divisors A, for converting the upper-bit data AH supplied as an address into the approximation of the squared reciprocal $[(1/AH)^2]$ and outputting the approximation; subtracter means for deriving a difference (AH−AL) between the upper-bit data AH and lower-bit data AL of the divisor A; and multiplier means connected to receive an output $[(1/AH)^2]$ of the conversion table means and an output (AH−AL) of the subtracter means, for deriving the product $[(1/AH)^2 \cdot (AH−L)]$ thereof to make the output $[(1/AH)^2]$ of the conversion table means more nearly equal to the reciprocal 1/A of the divisor A.

In the reciprocal arithmetic circuit, a precalculation or the subtraction (AH−AL) is effected by the subtracter means using the lower-bit data AL prior to the calculation by multiplier means. Therefore, the approximate calculation for approximating the output $[(1/AH)^2]$ of the conversion table means to the reciprocal 1/A of the divisor A can be effected by a simple operation of multiplying the output $[(1/AH)^2]$ of the conversion table means by the output (AH−AL) of the subtracter means. Further, since the subtraction (AH−AL) by the subtracter means is effected while the conversion operation is being effected by the conversion table, the operation time is not increased because of the subtracting operation of the subtracter means. In this way, according to the reciprocal arithmetic circuit, the pre-calculation is effected by use of the lower-bit data AL prior to the approximate calculation and the high-speed reciprocal calculation can be effected by simple hardware.

BRIEF DESCRIPTION OF THE DRAWINGS

FIG. 14 is a block diagram showing a reciprocal arithmetic circuit according to a fourth embodiment of this invention;

FIGS. 17A to 18C are diagrams showing the characteristics of the correction process effected by the reciprocal arithmetic circuit shown in FIG. 15;

FIG. 19 is a block diagram showing a reciprocal arithmetic circuit according to a fifth embodiment of this invention;

FIG. 22 is a block diagram showing a reciprocal arithmetic circuit according to a sixth embodiment of this invention;

DETAILED DESCRIPTION OF THE PREFERRED EMBODIMENTS

Figure 4:
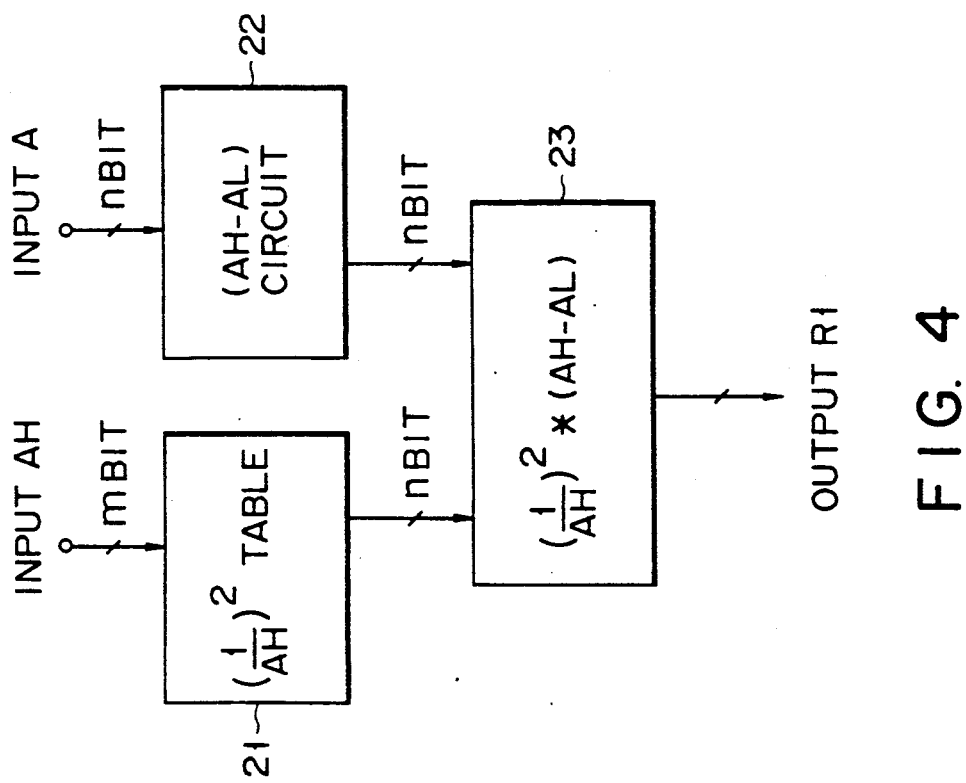
FIG. 4 is a block diagram showing a reciprocal arithmetic circuit according to a first embodiment of this invention.

FIG. 4 shows a reciprocal arithmetic circuit according to a first embodiment of this invention. The reciprocal arithmetic circuit derives an approximation of the reciprocal 1/A of the divisor A. First, the principle of the approximate calculation for deriving the approximation is explained.

In order to obtain the approximation of the reciprocal of the divisor A, the divisor A is first divided into upper m-bit data AH and lower (n-m)-bit data AL. That is, the divisor A can be expressed by the following equation:

$$A = AH + AL \quad (2)$$

Assume that A is expressed as follows:

$$A = a1 \cdot (\tfrac{1}{2}) + a2 \cdot (\tfrac{1}{2})^2 + \ldots + an \cdot (\tfrac{1}{2})^n \quad (3)$$

Then, the following equations can be obtained:

$$AH = a1 \cdot (\tfrac{1}{2}) + a2 \cdot (\tfrac{1}{2})^2 + \ldots + am \cdot (\tfrac{1}{2})^m \quad (4)$$

$$AL = am+1 \cdot (\tfrac{1}{2})^{m+1} + \ldots + an \cdot (\tfrac{1}{2})^n \quad (5)$$

The approximation is derived as follows:

First, the approximation R1 of the reciprocal 1/A can be expressed by the following equation:

$$R1 = \frac{1}{A} = \frac{1}{AH + AL} = \frac{AH - AL}{AH^2 - AL^2} \quad (6)$$

In this case, assume the following condition:

$$AH^2 >> AL^2 \quad (7)$$

Then, the following approximation can be obtained:

$$R1 \simeq \left(\frac{1}{AH}\right)^2 \cdot (AH - AL) \quad (8)$$

Thus, the reciprocal arithmetic circuit of the first embodiment effects the approximate calculation expressed by Eq. (8).

A ROM table 21 of FIG. 4 stores approximation information corresponding to the square reciprocals $[(1/AH)^2]$ of the upper-bit data AH of divisors A. The ROM table 21 receives the upper m-bit data AH of the divisor A as an address signal, converts the data AH into the reciprocal $[(1/AH)^2]$ of the square of the data AH and outputs the converted value. The output $[(1/AH)^2]$ consists of n bits. A subtracter circuit 22 derives a difference (AH−AL) between the upper m-bit data AH and lower (n-m)-bit data AL. An output (AH−AL) of the subtracter circuit 22 consists of n bits. The output $[(1/AH)^2]$ of the ROM table 21 and the output (AH−AL) of the subtracter circuit 22 are respectively supplied to first and second input terminals of a multiplier circuit 23. The multiplier circuit 23 multiplies the output $[(1/AH)^2]$ of the ROM table 21 by the output (AH−AL) of the subtracter circuit 22, and the output R1 of the multiplier circuit 23 becomes $(1/AH)^2 \cdot (AH-AL)$.

The result is equal to Eq. (8) and R1 determined by the approximate calculation is the approximation of the reciprocal 1/A.

In the approximate calculation, the approximation R1 can be made most nearly equal to the reciprocal 1/A when the bit number m of the upper-bit data AH is set to be larger than one half the bit number n of the divisor A, that is, $m \geq n/2$.

Figures 1, 3:
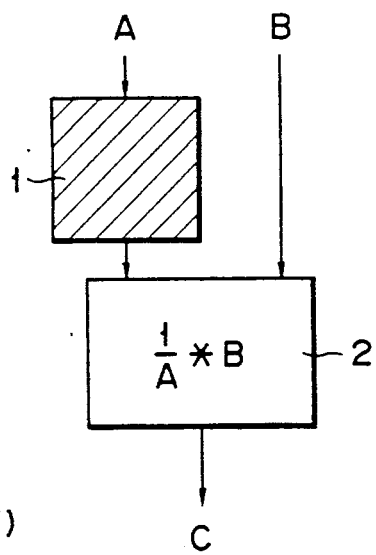
FIG. 1 is a block diagram showing the construction of an ordinary divider circuit.
FIG. 3 is a diagram showing the relation between the ROM size and the number of calculations in a case where the approximate calculation method shown in FIG. 2 is effected.
Figure 2:
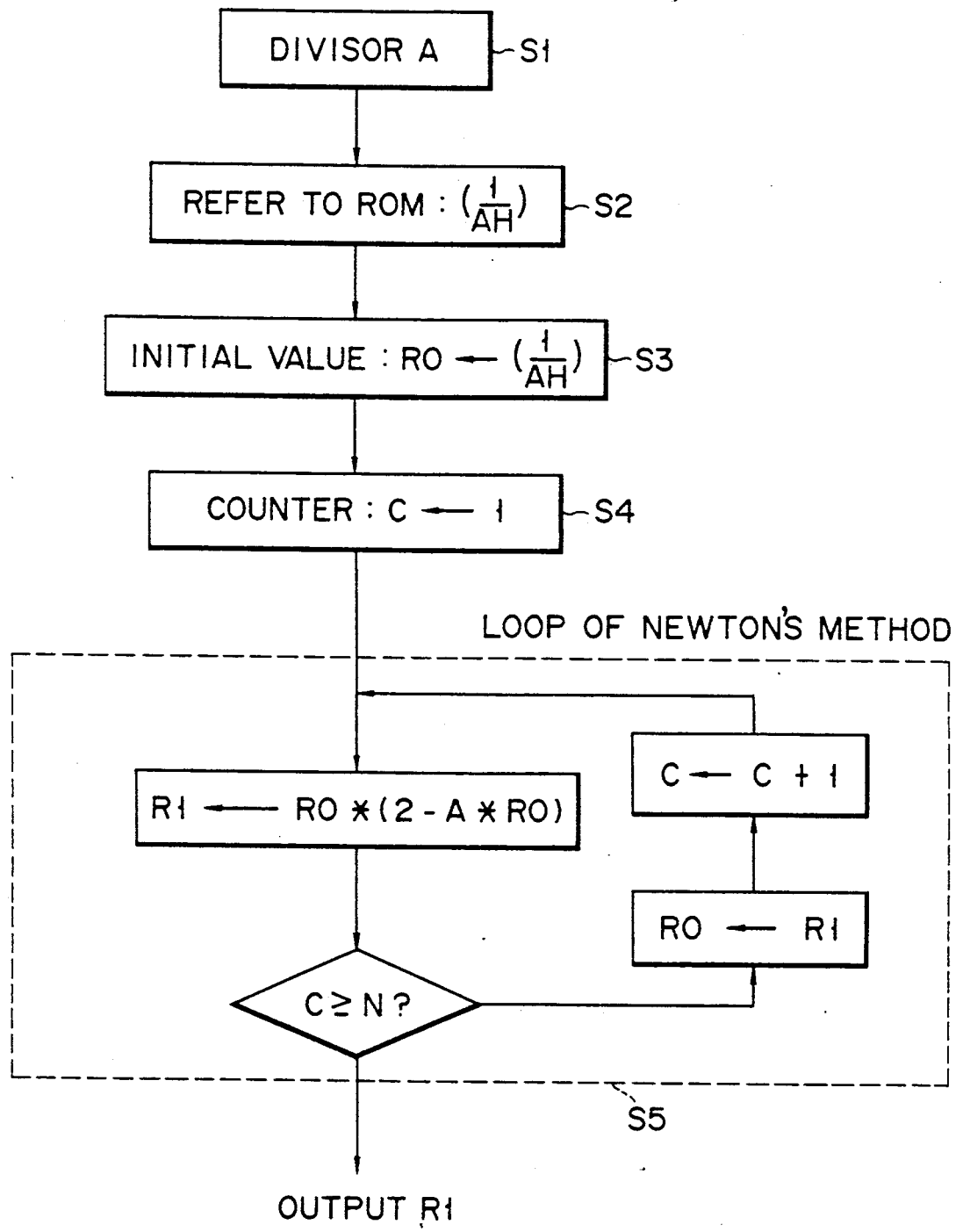
FIG. 2 is a flowchart for illustrating the approximate calculation method by using Newton's method.
Figure 5:
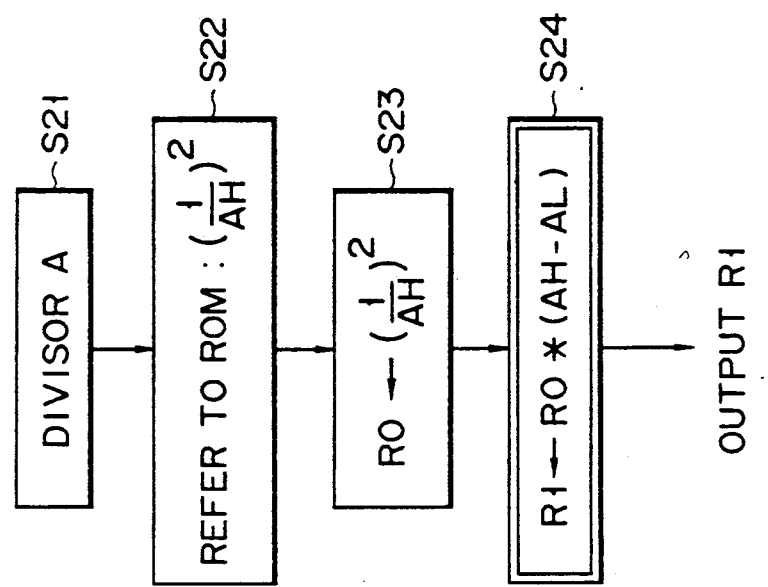
FIG. 5 is a flowchart showing the operation of the reciprocal arithmetic circuit shown in FIG. 4.

FIG. 5 is a flowchart showing the flow of the approximate calculation process of the reciprocal arithmetic circuit shown in FIG. 4. That is, table information is searched for according to the upper m-bit data AH of the divisor A supplied as an address signal and $(1/AH)^2$ is detected by the searching operation (steps S21 and S22). Then, $(1/AH)^2$ is used instead of R0 in the following equation (21).

$$R1 = R0 \cdot (AH - AL) \qquad (21)$$

After this, Eq. (21) is calculated (step S24). R1 is the reciprocal approximation to be obtained in the first embodiment.

Figure 6A:
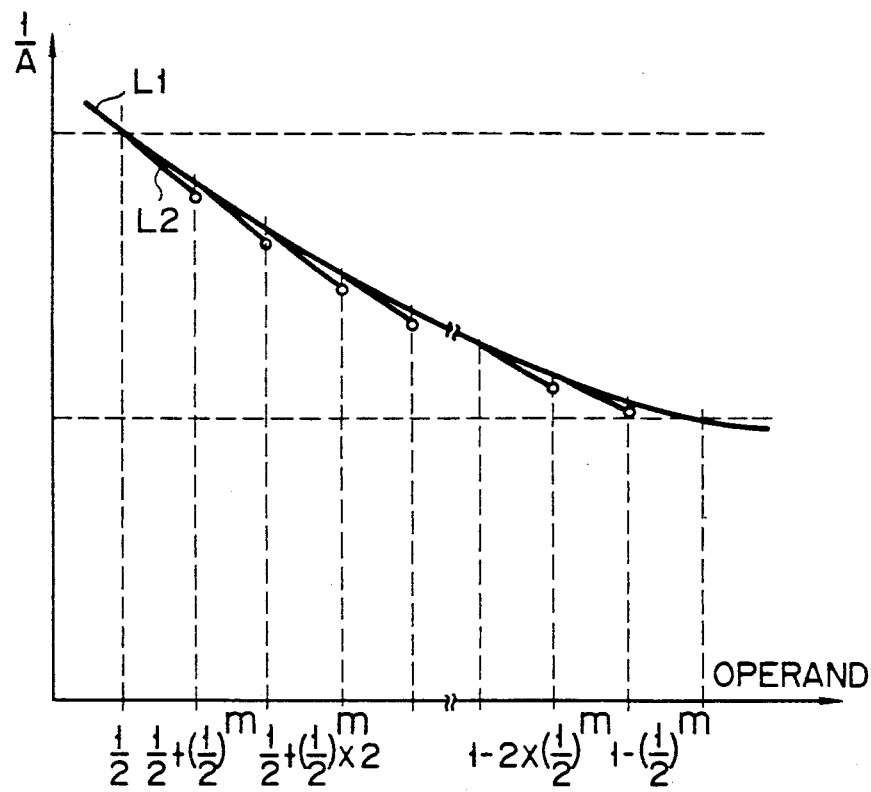
FIGS. 6A to 7B are diagrams showing the characteristics of the approximate calculation effected by the reciprocal arithmetic circuit shown in FIG. 4.
Figure 6B:
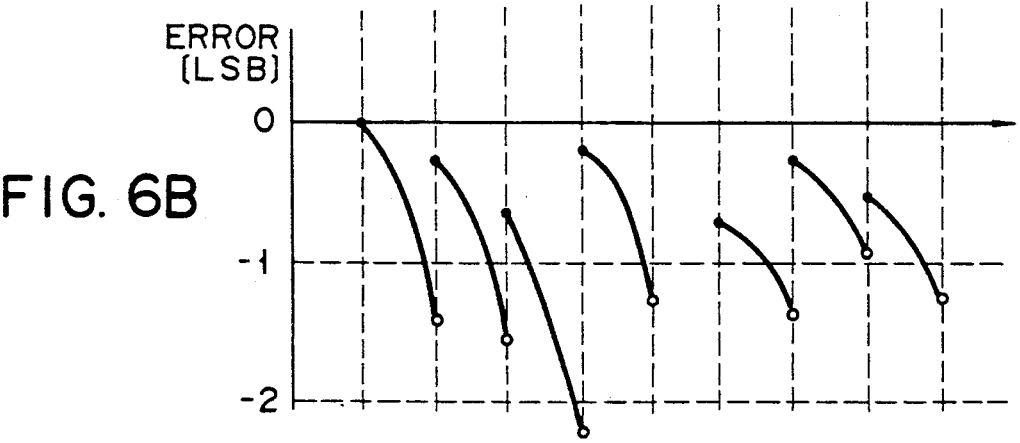

FIGS. 6A and 6B show the approximate calculation characteristics of the reciprocal arithmetic circuit of FIG. 4. That is, FIG. 6A shows the relation between the divisor A and the reciprocal 1/A in a case where the divisor A is increased in the step of $(\frac{1}{2})^m$. The line L1 in FIG. 6A shows an ideal relation therebetween and the line L2 shows a relation therebetween obtained by the approximate calculation of the reciprocal arithmetic circuit of the first embodiment.

In FIG. 6B, the magnitude of the error in the reciprocal approximation obtained by the reciprocal arithmetic circuit of the first embodiment is shown.

Figure 7A:
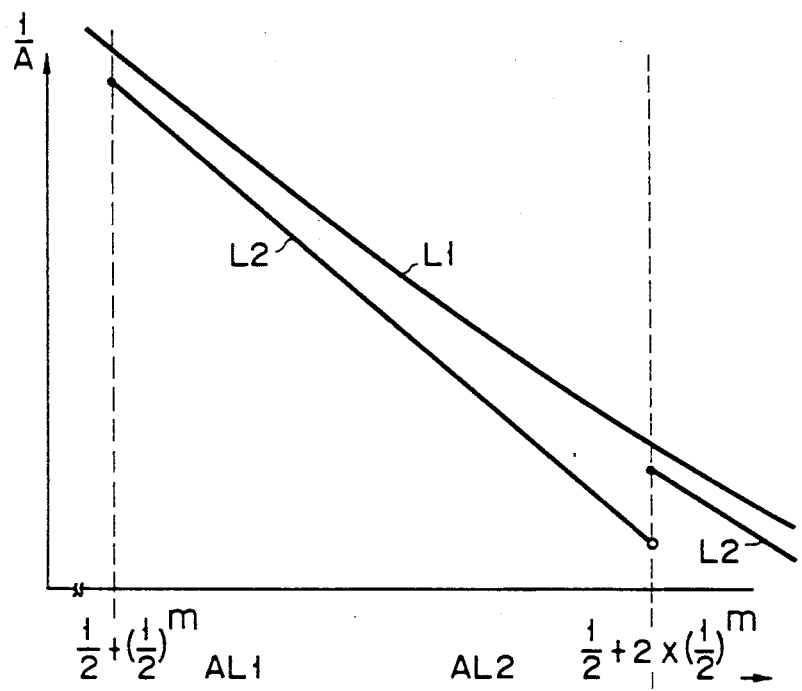
Figure 7B:
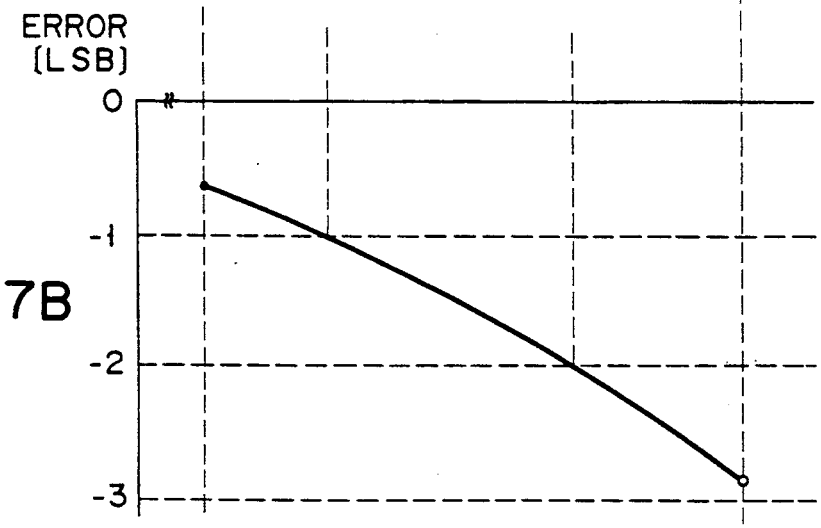

FIGS. 7A and 7B are enlarged views respectively corresponding to FIGS. 6A and 6B and show the approximate calculation characteristics in one step of variation in the divisor A or in that range of the divisor A which lies between $(\frac{1}{2})+(\frac{1}{2})^m$ and $(\frac{1}{2})+2(\frac{1}{2})^m$. As is clearly seen from FIG. 7B, the magnitude of the error becomes smaller than 1 [LSB] when the lower-bit data AL satisfies that $0 \leq AL < AL1$, it changes from 1 to 2 [LSB] inclusive when $AL1 \leq AL < AL2$, and it becomes larger than 2 [LSB] when $AL2 \leq AL$.

Now, the reciprocal arithmetic circuit of the first embodiment is explained by comparing the reciprocal arithmetic circuit based on the Newton's method. In the approximate calculation by the Newton's method, it is necessary to effect two multiplications and one subtraction for each calculation loop as shown in Eq. (1). In contrast, the approximate calculation of the first embodiment can be effected by effecting one multiplication and one subtraction as shown by Eq. (8). Further, the subtraction in the first embodiment is previously effected prior to the multiplication while the conversion process of $(1/AH)^2$ is being effected by use of the ROM table 21. Therefore, all the necessary calculation time required for the actual approximate calculation is not increased because of the subtracting operation.

In this way, the approximate calculation process can be simplified, the hardware for the calculation can be made simple in construction and the operation speed of the approximate calculation process can be enhanced.

Figure 8:
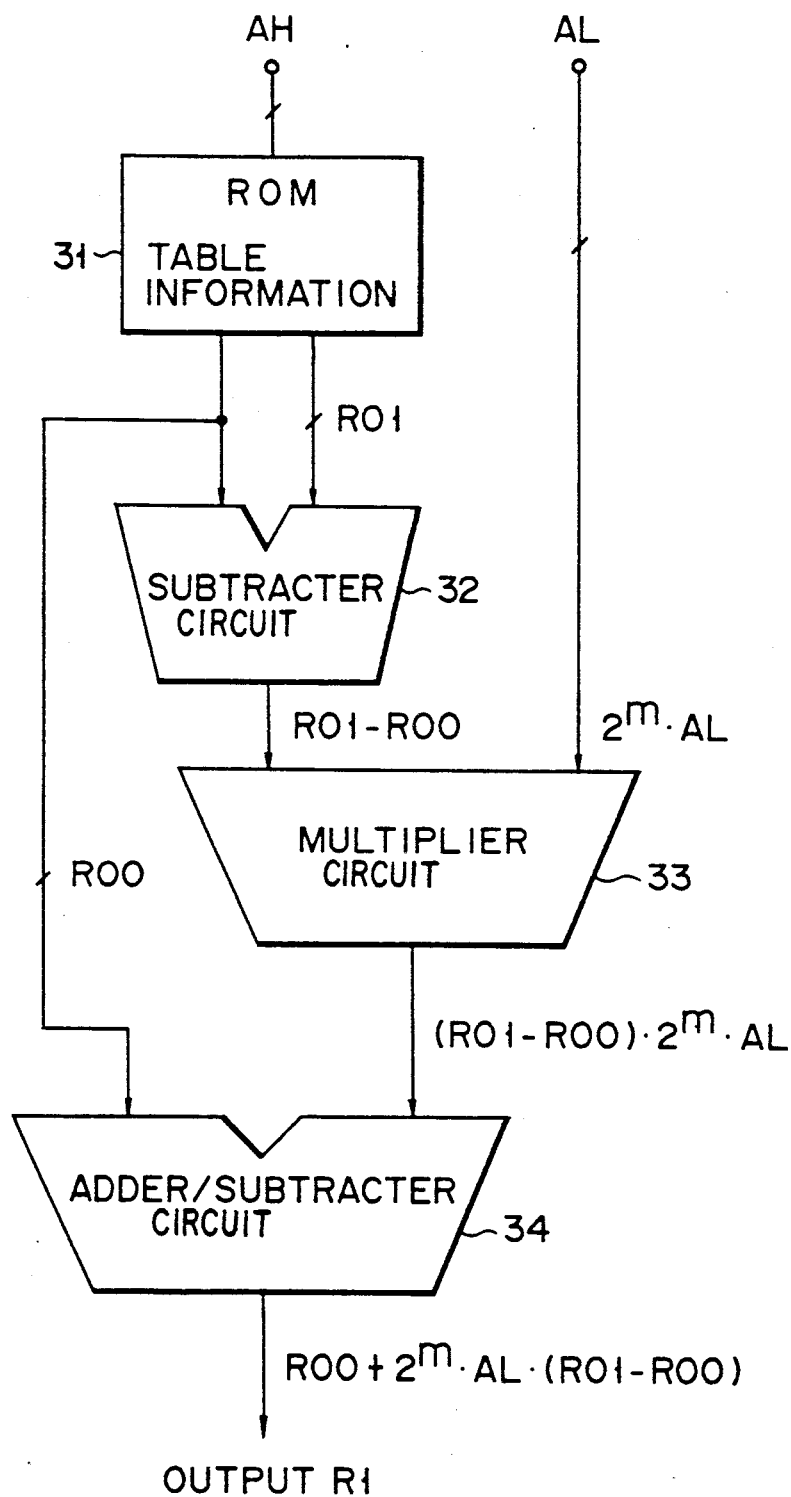
FIG. 8 is a block diagram showing a reciprocal arithmetic circuit according to a second embodiment of this invention.

FIG. 8 shows a reciprocal arithmetic circuit according to a second embodiment of this invention. First, the principle of the approximate calculation in the reciprocal arithmetic circuit is explained.

The n-bit divisor A after being normalized can be given as follows:

$$A = a1 \cdot (\tfrac{1}{2}) + a2 \cdot (\tfrac{1}{2})^2 + \ldots + an \cdot (\tfrac{1}{2})^n \qquad (9)$$

Further, the upper m-bit data AH and lower (m-n)-bit data AL are given as follows:

$$AH = a1 \cdot (\tfrac{1}{2}) + a2 \cdot (\tfrac{1}{2})^2 + \ldots + am \cdot (\tfrac{1}{2})^m \qquad (10)$$

$$AL = am+1 \cdot (\tfrac{1}{2})^{m+1} + \ldots + an \cdot (\tfrac{1}{2})^n \qquad (11)$$

The following relation can be set between the divisor A, the upper-bit data AH and the lower-bit data AL:

$$A = AH + AL \qquad (12)$$

Assume now that the following equations are satisfied:

$$AH1 = AH + (\tfrac{1}{2})^m \qquad (13)$$

$$AH0 = AH \qquad (14)$$

The following condition is satisfied:

$$AH0 \leq A < AH1 \qquad (15)$$

That is, the divisor A lies between AH0 and AH1 inclusive.

From Eq. (15), the following condition can be set:

$$1/AH1 < 1/A \leq 1/AH0 \qquad (16)$$

If, in this case, $1/AH1 = R01$ and $1/AH0 = R00$, then the following condition can be set:

$$R01 < 1/A \leq R00 \qquad (17)$$

That is, the reciprocal 1/A of the divisor A lies between R01 and R00. R01 is the reciprocal of AH1 or $[AH0 + (\tfrac{1}{2})^m]$, R00 is the reciprocal of AH0, and 1/A is the reciprocal of A or (AH0 + AL). Therefore, 1/A may be approximated on a straight line connecting R01 and R00 and the value thereof can be obtained by a linear function.

Based on the coordinate $[AH0 + (\tfrac{1}{2})^m, R01]$ of R01, the coordinate (AH0 + AL, 1/A) of 1/A, and the coordinate (AH0, R00) of R00, the following approximate equation representing 1/A can be obtained:

$$1/A = R1 \approx \frac{AL \cdot R01 + \{(\tfrac{1}{2})^m - AL\} \cdot R00}{AL + \{(\tfrac{1}{2})^m - AL\}} \qquad (18)$$

$$R1 \approx R00 + 2^m \cdot AL \cdot (R01 - R00)$$

The reciprocal arithmetic circuit of the second embodiment effects the approximate calculation shown in Eq. (18).

In the reciprocal arithmetic circuit of the second embodiment shown in FIG. 8, a ROM table 31 stores approximation information of reciprocals (1/AH) of the upper-bit data AH of divisors A, and approximation information of $[(1/AH) + (\tfrac{1}{2})^m]$. The ROM table 31 receives the upper m-bit data AH of the divisor A as an address signal, converts the address data AH into the reciprocal (1/AH) thereof and then outputs the same. At the same time, it converts the address data AH into the reciprocal $$\left[ \frac{1}{AH + (\tfrac{1}{2})^m} \right]$$

the data [AH + ($\tfrac{1}{2}$)m] and outputs the same. That is, the reciprocal (1/AH) of the data AH and the reciprocal $$\left[\frac{1}{AH + (\frac{1}{2})^m}\right]$$

of the data $[AH+(\frac{1}{2})^m]$ are read out from the ROM 31 at the same time. The two readout reciprocal approximate data are respectively set to R00 ($=1/AH=AH0$) and R01

$$\left(\simeq \frac{1}{AH + (\frac{1}{2})^m} = AH1\right).$$

In this case, R00, R01 and the reciprocal 1/A satisfy the relation of R01<1/A≦R00 as described before.

The reciprocal approximate data R00 read out from the ROM table 31 is supplied to one input terminal of a subtracter circuit 32 and one input terminal of an adder/subtracter circuit 34. On the other hand, the reciprocal approximate data R01 read out from the ROM table 31 is supplied to the other input terminal of the subtracter circuit 32. The subtracter circuit 32 derives a difference (R01-R00) between the reciprocal approximate data R01 and R00. The difference output (R01-R00) of the subtracter circuit 32 is supplied to one input terminal of a multiplier circuit 33. The other input terminal of the multiplier circuit 33 is supplied with the lower (n-m)-bit data AL of the divisor A which is carried by $2^m$ bits or shifted by m bits to the left or in an upper digit direction. That is, the other input terminal of the multiplier circuit 33 is supplied with $2^m$.AL The multiplier circuit 33 multiplies the output (R01-R00) of the subtracter 32 by $2^m$.AL to supply an output of $2^m$.AL.(R01-R00) to the other input terminal of the adder/subtracter circuit 34. Then, the adder/subtracter circuit 34 adds R00 to $2^m$.AL.(R01-R00), and outputs an addition result [R00+$2^m$.AL.(R01-R00)] as the approximation R1 of the reciprocal 1/A.

Figure 9:
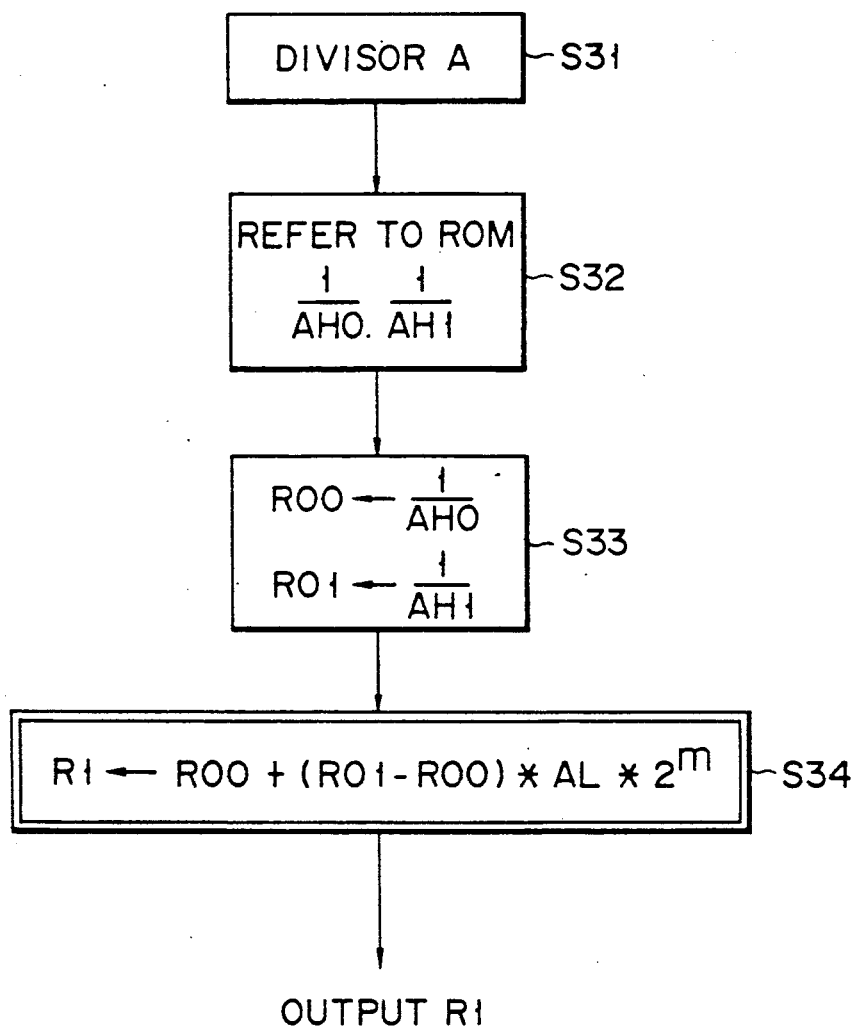
FIG. 9 is a flowchart showing the operation of the reciprocal arithmetic circuit shown in FIG. 8.

FIG. 9 is a flowchart showing the approximate calculation process of the reciprocal arithmetic circuit according to the second embodiment shown in FIG. 8. That is, memory information of the ROM table 31 is searched for according to the upper m-bit data AH of the divisor A used as an address. As the result of this searching operation, the approximate reciprocal (1/AH)=(1/AH0) of the data AH and the approximate reciprocal $$\left[\frac{1}{AH + (\frac{1}{2})^m}\right] = (1/AH1)$$

of the data $[AH+(\frac{1}{2})^m]$ are obtained at the same time (steps S31 and S32). Next, 1/AH0 and 1/AH1 are substituted for R00 and R01 (step S33), and then the approximate calculation shown in Eq. (18) is made (step S34).

Like the first embodiment, in the second embodiment, the multiplier circuit 33 is required to effect only one multiplication of (R01-R00) and $2^m$.AL in order to make the approximate calculation. As described before, the multiplication of $2^m$.AL can be obtained by shifting the lower-bit data AL to the left by m bits.

Further, in the second embodiment, since the precalculation based on the approximate reciprocal data R01 and lower-bit data AL is made by use of the subtracter circuit 32 and multiplier circuit 33, the approximate calculation for making the approximate reciprocal data R00 nearer to the reciprocal 1/A of the divisor A can be made only by an addition by means of the adder/subtracter circuit 34. In this way, in the second embodiment, the reciprocal calculation can be made at a high speed by use of hardware which simple in construction.

Figure 10:
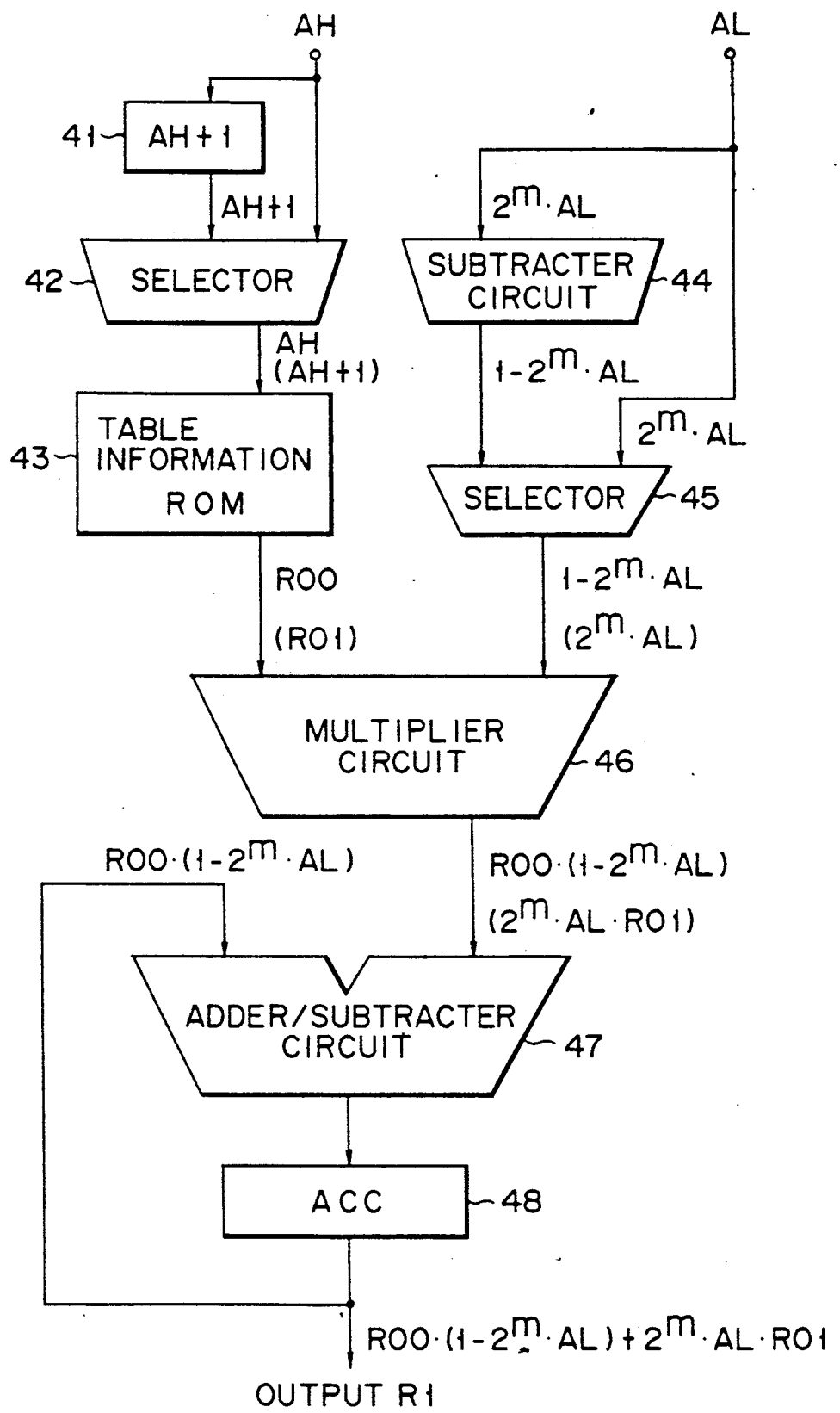
FIG. 10 is a block diagram showing a reciprocal arithmetic circuit according to a third embodiment of this invention.

FIG. 10 shows a modification of the reciprocal arithmetic circuit according to the second embodiment shown in FIG. 8. Like the second embodiment, the reciprocal arithmetic circuit of FIG. 10 derives the approximation R1 of a reciprocal 1/A by use of two approximate reciprocal data R00 and R01 generated from a ROM table. However, unlike the second embodiment in which the approximate calculation is made based on Eq. (18), the following approximation calculation is used:

$$R1=R00.(1-2^m.AL)+2^m.AL.R01 \qquad (24)$$

It is easily understood that Eq. (24) is a modification of Eq. (18).

In FIG. 10, the ROM table 43 stores approximation information of reciprocals (1/AH) of upper-bit data AH of divisors A.

An adder circuit 41 and a selector 42 are provided in the preceding stage of the ROM table 43 and data AH and AH+1 are selectively supplied to the ROM table 43 by means of the adder circuit 41 and selector 42. The ROM table converts the data AH into the reciprocal (1/AH=R00) thereof and outputs the same in response to the upper m-bit data AH of the divisor A supplied as an address signal. In contrast, it converts the data $AH+(\frac{1}{2})^m$ into the reciprocal $$\left(\frac{1}{AH + (\frac{1}{2})^m} = R01\right)$$

thereof and outputs the same in response to the data $AH+(\frac{1}{2})^m$ supplied as an address signal.

The output R00 or R01 of the ROM table 43 is supplied to one input terminal of a multiplier circuit 46. A subtracter circuit 44 and a selector 45 are provided in the preceding stage of the other input terminal of the multiplier circuit 46. The subtracter circuit 44 receives the lower m-bit data AL of the divisor A which is shifted by m bits to the left and derives a subtraction result of (1-$2^m$.AL). The output (1-$2^m$.AL) of the subtracter 44 is supplied to one input terminal of the selector 45. The subtracter 45 also receives the lower-bit data AL which is shifted by m bits to the left at the other input terminal thereof. The selector 45 selectively supplies (1-$2^m$.AL) or $2^m$.AL to the other input terminal of the multiplier circuit 46.

The multiplier circuit 46 multiplies the output R00 (or R01) of the ROM table 43 by the output (1-$2^m$.AL) (or $2^m$.AL) to supply the multiplication result R00.(1-$2^m$.AL) or $2^m$.AL.R01 to a first input terminal of an adder/subtracter circuit 47. An output of the adder/subtracter circuit 47 is fed back to a second input terminal thereof via an accumulator 48. Therefore, the adder/subtracter circuit 47 adds together R00.(1-$2^m$.AL) and $2^m$.AL.R01 and outputs the addition result R00.(1-2m.AL)+$2^m$.AL.R01 as the approximation R1 of the reciprocal 1/A.

As described above, in the reciprocal arithmetic circuit of FIG. 10, the first data R00.(1-$2^m$.AL) is derived in the first operation cycle and the second data $2^m \cdot AL \cdot R01$ is derived and the first and second data are added together in the second operation cycle.

Figure 11:
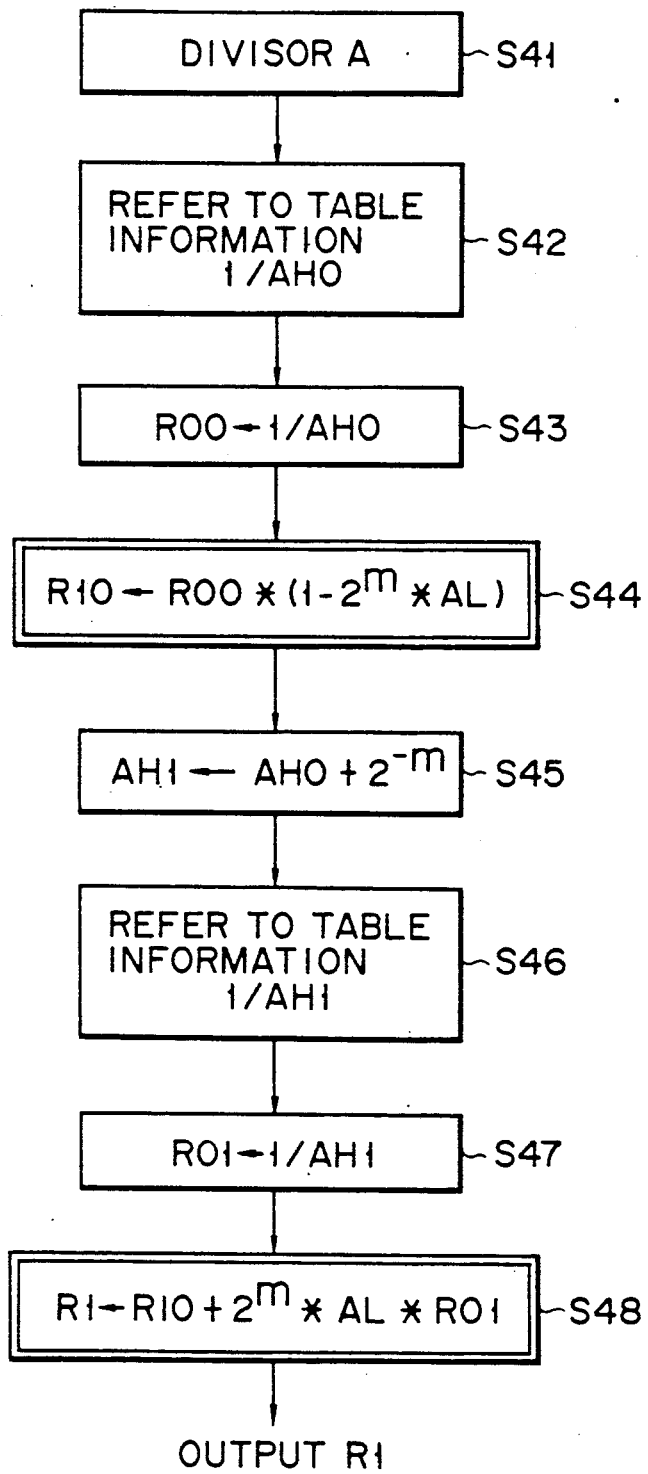
FIG. 11 is a flowchart showing the operation of the reciprocal arithmetic circuit shown in FIG. 10.

FIG. 11 is a flowchart showing the approximation calculation process of the reciprocal arithmetic circuit of FIG. 10.

(1) First Cycle

First, data AH is supplied to the ROM table 43 and the reciprocal approximate data 1/AH of the data AH or R00 is derived (steps S41 to S43). At the same time, a subtraction of $[1-(2^m \cdot AL)]$ is effected by means of the subtracter circuit 44.

Then, the multiplier circuit 46 multiplies the output R00 of the ROM table 43 by the output $(1-2^m \cdot AL)$ of the subtracter circuit 44. The multiplication result is added to "0" by means of the adder/subtracter circuit 47 and then stored as R10 into the accumulator 48 (step S44).

(2) Second Cycle

First, address data AH+1 is input to the ROM table 43 to read out $$\frac{1}{AH + (\frac{1}{2})^m}$$

or R01 from the ROM table 43 (steps S45 to S47).

Then, the multiplier circuit 46 multiplies the output of the ROM table 43 by the output $2^m \cdot AL$ of the selector 45.

After this, the adder/subtracter circuit 47 adds the output $2^m \cdot AL \cdot R01$ of the multiplier circuit 46 to the data R10 or R00 $(1-2^m \cdot AL)$ stored in the accumulator 48 (step S48).

By effecting the above two operation cycles, the approximate R1 of the reciprocal 1/A can be derived.

Figure 12A:
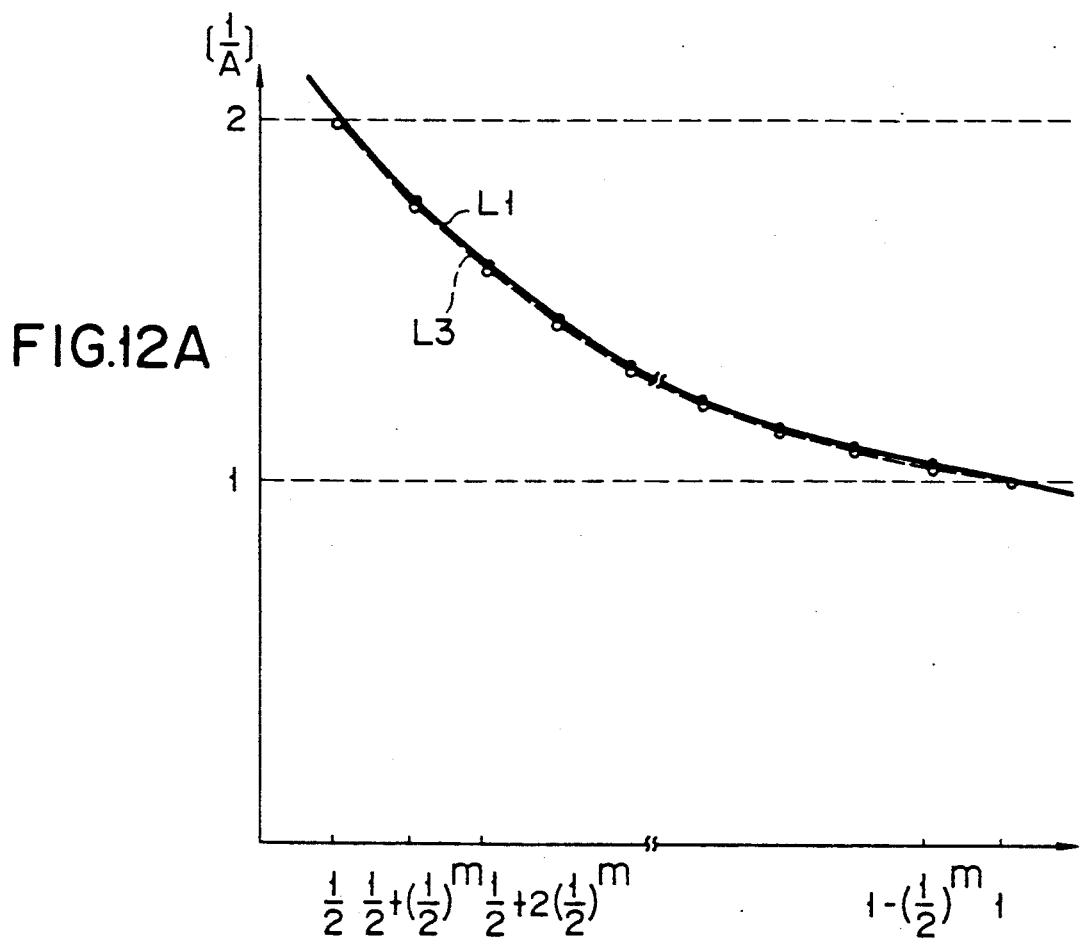
FIGS. 12A to 13B are diagrams showing the characteristics of the approximate calculation effected by the reciprocal arithmetic circuit according to the second embodiment of this invention shown in FIG. 8.
Figure 12B:
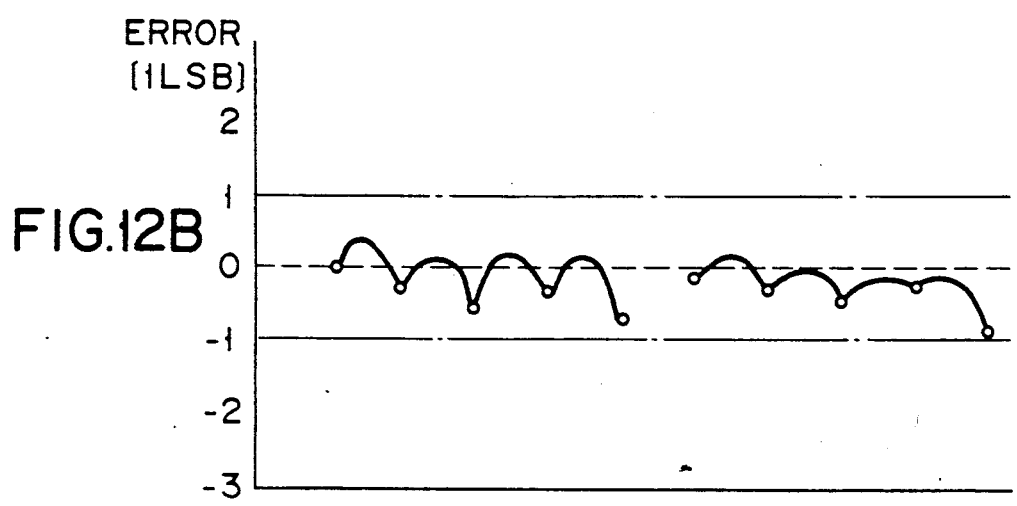
Figure 13A:
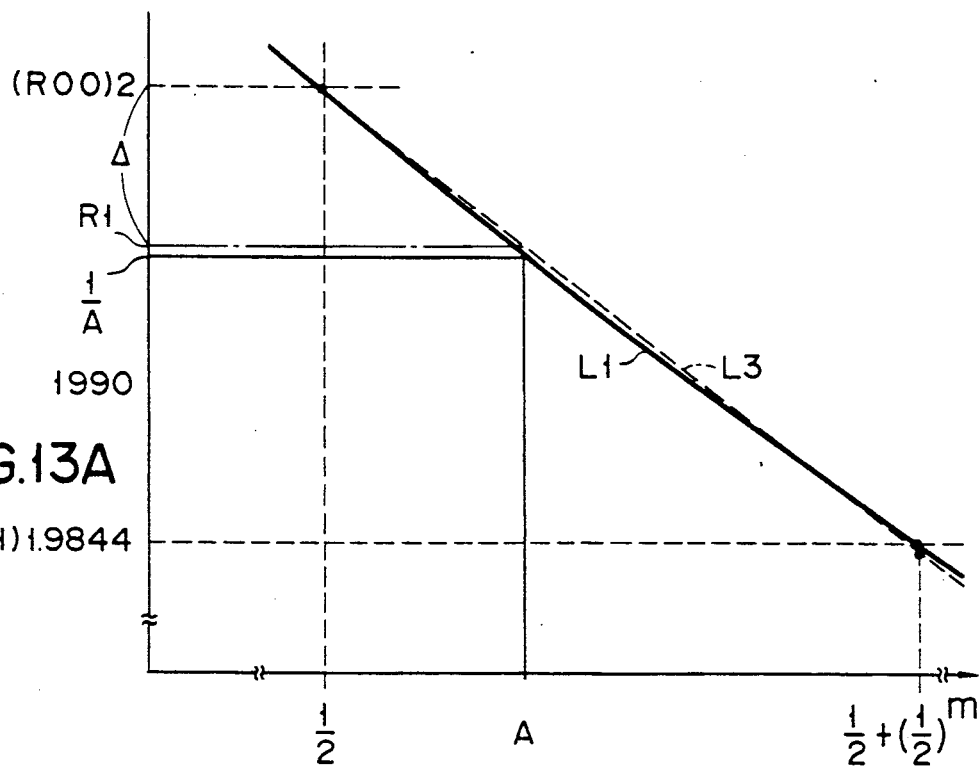
Figure 13B:
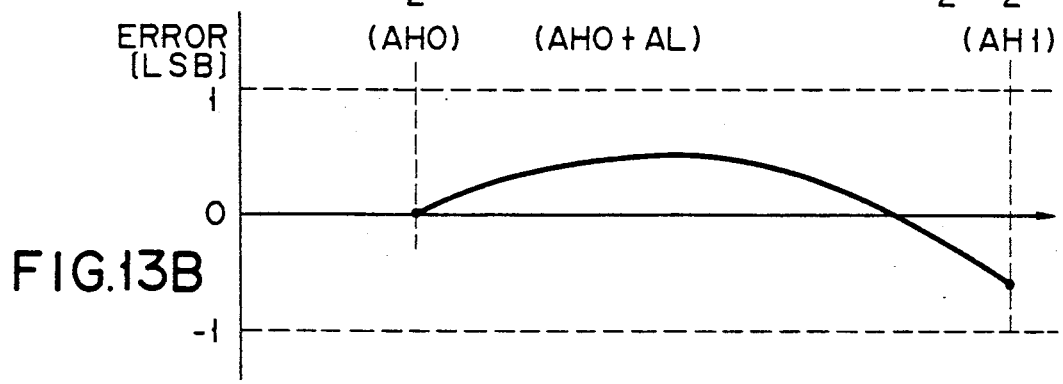

FIGs. 12A and 12B show the approximate calculation characteristics of the second embodiment shown in FIG. 8. That is, FIG. 12A shows the relation between the divisor A and the reciprocal 1/A thereof in a case where the divisor A increases in the step of $(\frac{1}{2})^m$, and the line L1 indicates the ideal relation therebetween and the line L3 indicates the relation obtained by the approximate calculation by the reciprocal arithmetic circuit according to the second embodiment. The modification of the second embodiment shown in FIG. 10 also has the same approximate calculation characteristics as shown by the line L3. FIG. 12B shows the magnitude of an error of the reciprocal approximation obtained by use of the reciprocal arithmetic circuit of the second embodiment. FIGS. 13A and 13B are enlarged views respectively corresponding to FIGS. 12A and 12B and show the approximate calculation characteristics in one step of variation in the divisor A or in that range of the divisor A which lies between $(\frac{1}{2})+(\frac{1}{2})^m$ and $\frac{1}{2}$.

In a reciprocal arithmetic circuit according to a third embodiment to be described below, the function of detecting an error caused by the approximate calculation made in the first and second embodiments and correcting the reciprocal approximation R1 is further added.

FIG. 14 schematically shows the reciprocal arithmetic circuit according to the third embodiment. As described with reference to FIG. 7B, the magnitude of an error in the reciprocal approximation R depends on the lower-bit data AL. For this reason, in the third embodiment, the range of the lower-bit data AL for the error of 2 [LSB] or more is previously stored into a ROM table 51 and the reciprocal approximation R1 is corrected when the value of the lower-bit data AL of the divisor A lies in the range stored in the ROM table 51. The determination whether or not the value of the lower-bit data AL of the divisor A lies in the error occurrence range stored in the ROM table 51 is made by means of a comparison circuit 53. Further, the correction process for the reciprocal approximation R1 is effected by adding or subtracting a correction value D to or from R1 by use of adder/subtracter circuit 55.

Figure 15:
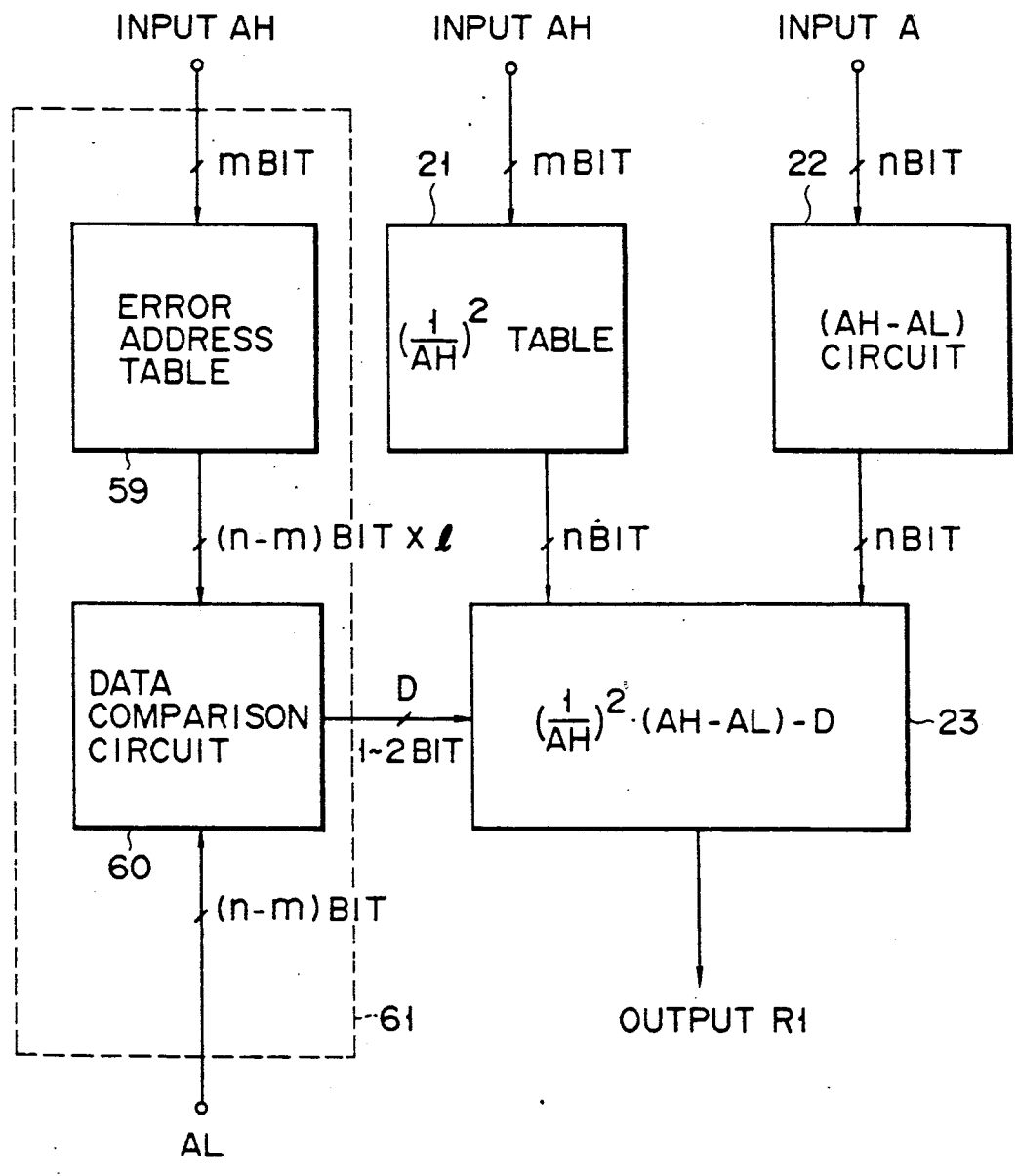
FIG. 15 is a block diagram showing the detailed construction obtained by applying the principle of a correction process by the reciprocal arithmetic circuit according to the fourth embodiment of this invention to the reciprocal arithmetic circuit of FIG. 4 according to the first embodiment.

FIG. 15 shows the detail construction obtained by applying the third embodiment to the first embodiment shown in FIG. 4. As shown in FIG. 15, an error correction circuit 61 includes a ROM table 59 and a comparison circuit 60. The ROM table 59 stores the error occurrence range of the lower-bit data AL which is determined based on the error characteristics (see FIGS. 6B and 7B) of the reciprocal arithmetic circuit of the first embodiment.

That is, the ROM table 59 stores that value AL1 of the lower-bit data which causes an error of 2 [LSB] and that value AL2 of the lower-bit data which causes an error of 3 [LSB] together with the corresponding input upper-bit data AH. The comparison circuit 60 compares each value of the lower-bit data AL1 and AL2 output from the ROM table 59 with the value of the lower-bit data AL of the divisor A to detect the error occurrence range to which the lower-bit data AL belongs.

For example, when the comparator 60 detects that the lower-bit data AL belongs to the range of $0 \leq AL < AL1$, it generates the correction value D of "0" since the magnitude of the error is less than 1 [LSB]. Further, when it is detected that the lower-bit data AL lies in the range of $AL1 \leq AL < AL2$, the comparator 60 generates the correction value D of "−1" since the magnitude of the error lies between 1 [LSB] and 2 [LSB] and it is necessary to make the error less than 1 [LSB]. When it is detected that the lower-bit data AL lies in the range of $AL2 \leq AL$, the comparator 60 generates the correction value D of "−2" since the magnitude of the error is more than 2 [LSB].

Figure 16:
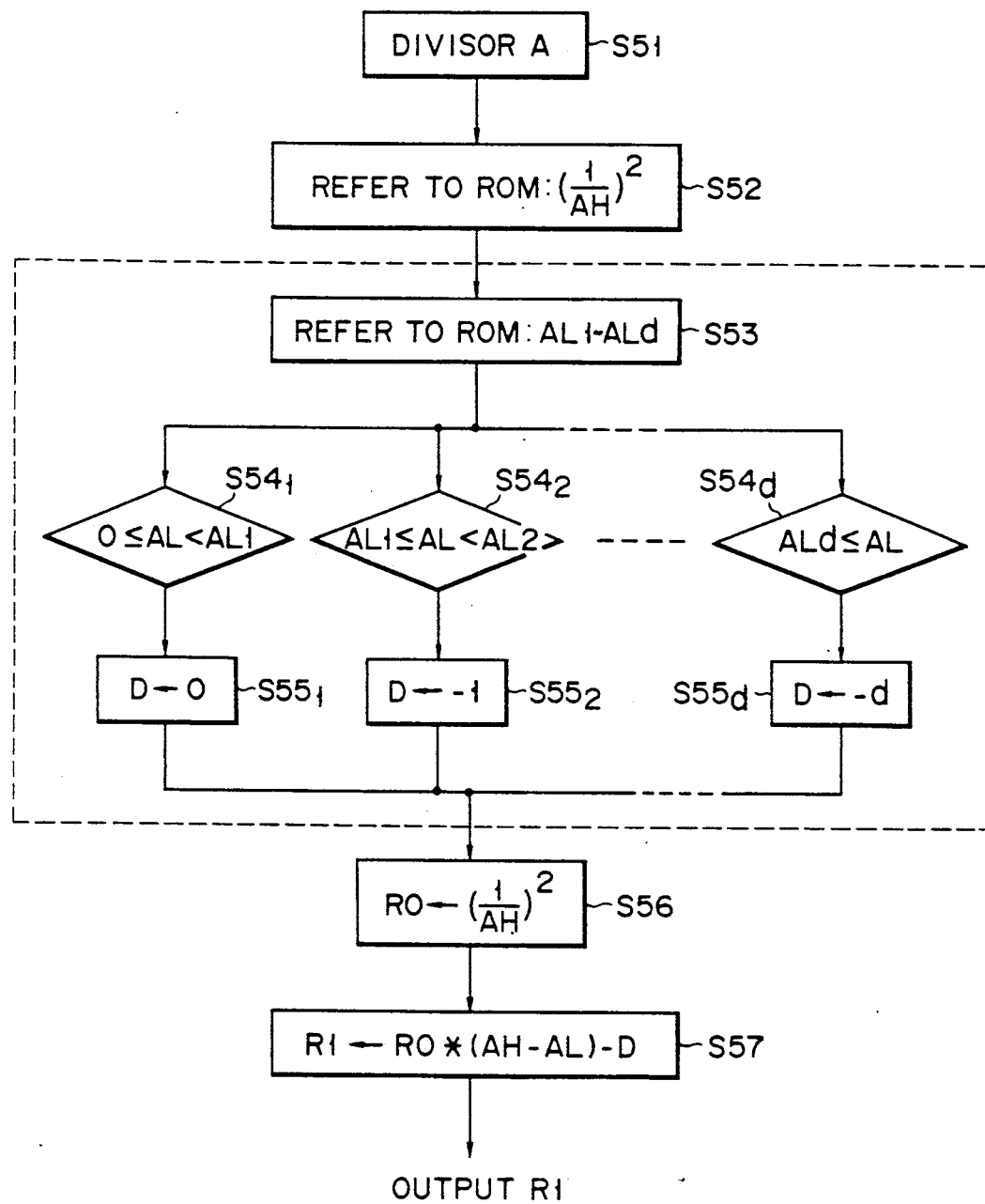
FIG. 16 is a flowchart showing the correction process by the reciprocal arithmetic circuit shown in FIG. 15.

Next, the operation of the reciprocal arithmetic circuit of FIG. 15 is explained with reference to a flowchart shown in FIG. 16. First, the upper-bit data AH of the divisor A is input as an address signal to the ROM table 21 to read out $(1/AH)^2$ from the ROM table 21 (steps S51 and S52). Likewise, the upper-bit data AH is input to the ROM table 59 to read out the value AL1, AL2, ---, ALd of the lower-bit data which may cause an error from the ROM table 59 (step S53). In this case, AL1 is the minimum value of the lower-bit data AL which causes an error of 2 [LSB], AL2 is the minimum value of the lower-bit data AL which causes an error of 3 [LSB] and ALd is the minimum value of the lower-bit data AL which causes an error of d+1 [LSB].

The comparator circuit 60 compares the value AL1, AL2, ---, ALd with the lower-bit data AL of the divisor A to determine the error occurrence range ($0 \leq AL < AL1$, $AL1 \leq AL < AL2$, or $ALd \leq AL$) to which the lower-bit data AL belongs (steps S54l to S54d). Then, in order to make the error of the approximate calculation less than 1 [LSB], the correction value D is determined according to the error occurrence range to which AL belongs (steps S55l to S55d).

Next, a calculation of $R0 \cdot (AH - AL)$ is made by an operation circuit 23' with the output $(1/AH)^2$ of the ROM table 21 used as R0 (steps S56 and S57).

FIGS. 17A to 17C show the characteristics of the approximate calculation operation of the reciprocal arithmetic circuit of FIG. 15. That is, the approximate calculation characteristic prior to the correction process is shown by a line L2 and the ideal characteristic is shown by a line L1 in FIG. 17A. FIG. 17B shows the error characteristic prior to the correction process and FIG. 17C shows the error characteristic after the correction process. As is clearly seen from FIG. 17C, the error after the correction process becomes less than 1 [LSB] and the approximate reciprocal R1 becomes equal to the true reciprocal 1/A obtained in the fraction cutoff mode.

Figure 18A:
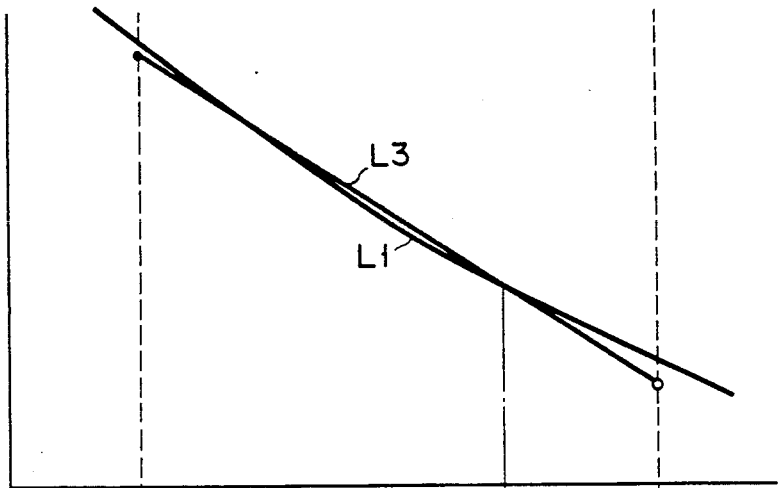
Figure 18B:
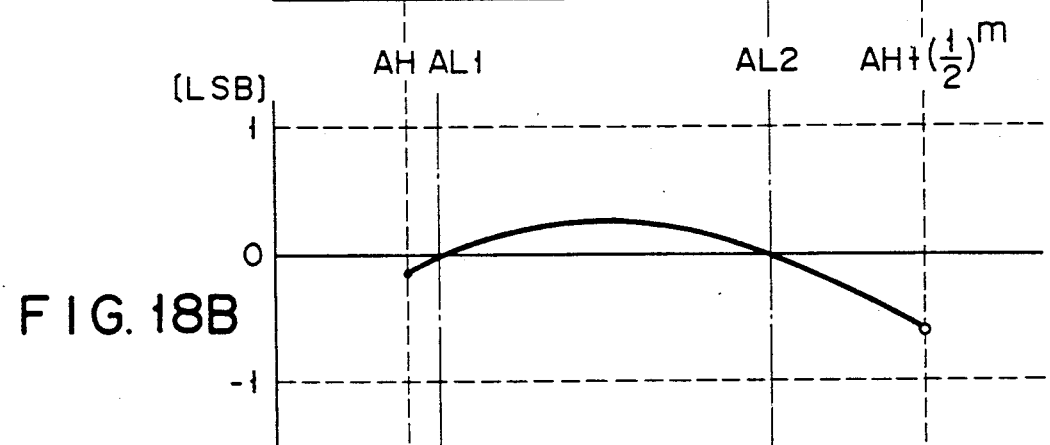
Figure 18C:
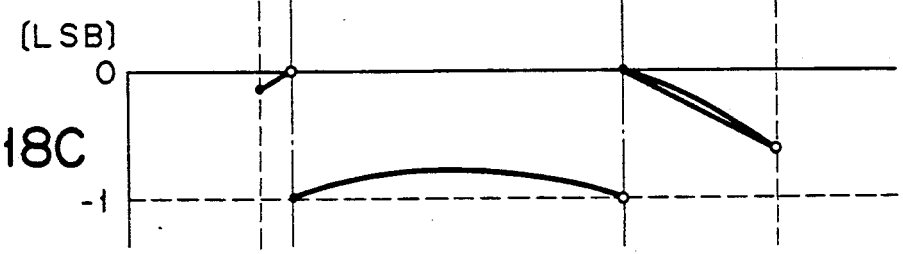

FIGS. 18A to 18C show the characteristics of the approximate calculation operation of the reciprocal arithmetic circuit obtained by applying the third embodiment of FIG. 14 to the reciprocal arithmetic circuit of the second embodiment shown in FIG. 8. That is, the approximate calculation characteristic prior to the correction process is shown by a line L3 and the ideal characteristic is shown by a line L1 in FIG. 18A. FIG. 18B shows the error characteristic prior to the correction process and FIG. 18C shows the error characteristic after the correction process. As is clearly seen from FIG. 18C, the error after the correction process can be made less than 1 [LSB] also in a case where the correction process of the third embodiment is applied to the second embodiment.

$$R1 = 1/A = \frac{1}{AH + AL} = \frac{1}{AH^3 + AL^3} \cdot$$

$$(AH^2 - AH \cdot AL + AL^2)$$

Assuming that $AH^3 >> AL^3$, then the following expression can be obtained:

$$R1 \simeq \frac{1}{AH^3} \cdot (AH^2 + AH \cdot AL + AL^2) \quad (19)$$

In the fourth embodiment, the approximate calculation shown in Eq. (19) is effected according to the flowchart shown in FIG. 20 so as to derive an approximation R1.

A reciprocal arithmetic circuit of the fourth embodiment shown in FIG. 19 includes a ROM table 71, selectors 72 to 74, a multiplier circuit 75, an adder/subtracter circuit 76 and an accumulator 77.

The ROM table 71 stores approximation information of the cubes $(1/AH)^3$ of the reciprocals of the upperbit data AH of divisors A. In the reciprocal arithmetic circuit, the upper-bit data AH is first selected by means of the selectors 72 and 73, a calculation of (AH.AH+0) is made by the multiplier circuit 75 and adder/subtracter circuit 76, and the calculation result is stored as ACC0 into the accumulator 77. Next, the lower-bit data AL is selected by means of the selectors 72 and 73 and an output of the accumulator 77 is selected by means of the selector 74. As a result, an operation of (AL.AL+ACC0) is effected by use of the multiplier circuit 75 and the adder/subtracter circuit 76 and the operation result is stored as ACC0 into the accumulator 77. Then, the upper-bit data AH is selected by means of the selector 72, the lower-bit data AL is selected by means of the selector 73, and an output of the accumulator 77 is selected by means of the selector 74. As a result, an operation of (ACC0-AH AL) is effected by use of the multiplier circuit 75 and adder/subtracter circuit 76 and $(AH^2+AL^2-AH.AL)$ is newly stored as ACC0 into the accumulator 77. Next, an output of $(1/AH)^3$ of the ROM table 71 is selected by means of the selector 72 and an output of the accumulator 77 is selected by means of the selector 73. Therefore, an operation of $ACC0.(1/AH)^3+0$ is effected by means of the multiplier circuit 75 and the adder/subtracter circuit 76 and the operation result is stored as ACC0 into the accumulator 77 again. As a result, the same operation result as that of Eq. (19) can be obtained in the accumulator 77.

Figures 20, 21:
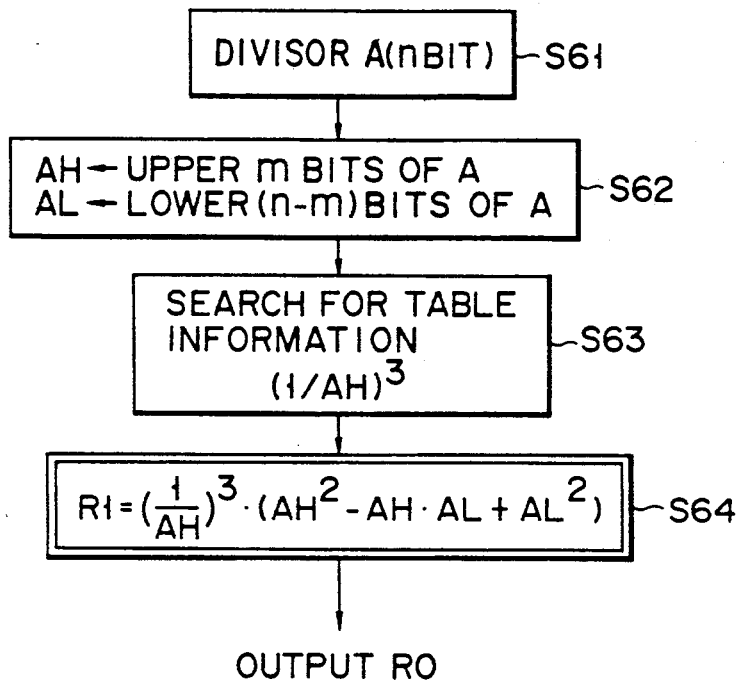
FIG. 20 is a flowchart showing the operation of the reciprocal arithmetic circuit shown in FIG. 19.
FIG. 21 is a diagram showing the relation between the number of bits of the divisor A and the ROM size in the reciprocal arithmetic circuit shown in FIG. 19.

FIG. 21 shows the relation between the bit number n of the divisor A and the bit number m of the upper-bit data AH, and in the fifth embodiment, m=3 bits when n=8 bits, for example. That is, in the fourth embodiment, it becomes possible to reduce the number of bits to be input to the ROM table in comparison with the approximation process using the full-bit method and Newton's method mentioned before, thereby making it possible to reduce the memory capacity of the ROM table.

FIG. 22 shows a reciprocal arithmetic circuit according to the fifth embodiment of this invention. First, the principle of the calculation of the approximation R1 in the fifth embodiment is explained.

$$R1 = 1/A = \frac{1}{AH + AL} = \frac{1}{AH^4 + AL^4} \cdot$$

$$(AH - AL) \cdot (AL^2 + AL^2)$$

Assuming that $AH^4 >> AL^4$, the following expression can be obtained:

$$R1 \simeq (1/AH)^4 \cdot (AH-AL) \cdot (AH^2+AL^2) \quad (20)$$

In the fifth embodiment, the approximation R1 of the reciprocal 1/A can be derived by effecting the approximate calculation of Eq. (20) according to the flowchart of FIG. 23.

The reciprocal arithmetic circuit according to the fifth embodiment shown in FIG. 22 includes a ROM table 81, selectors 82 to 84, a multiplier circuit 85, an adder/subtracter circuit 86, and accumulators 87 and 88.

The ROM table 81 stores approximation information of reciprocals $(1/AH)^4$ of the upper-bit data AH of divisors A to the fourth power. In the reciprocal arithmetic circuit, the upper-bit data AH is first selected by means of the selectors 82 and 83, a calculation of $AH^2$ is made by the multiplier circuit 85, and $AH^2$ is stored as ACC0 into the accumulator 87. Next, the lower-bit data AL is selected by means of the selectors 82 and 83, a calculation of $AL^2$ is made by the multiplier circuit 85, and $AL^2$ is stored as ACC1 into the accumulator 88. Then, an operation of (ACC0+ACC1) is effected by use of the adder/subtracter circuit 86 and $(AH^2+AL^2)$ is newly stored as ACC0 into the accumulator 87. Next, an operation of (AH−AL) is effected by use of the adder/subtracter circuit 86 and the operation result is stored into the accumulator 88. Next, an output of $(1/AH)^4$ is read out from the ROM table 81 and then an operation of ACC1 $(1/AH)^4$ is effected by means of the multiplier circuit 85 and the operation result is newly stored as ACC1 into the accumulator 88 again. Then, a multiplication (ACC1.ACC0) of data in the accumulators 87 and 88 is effected by means of the multiplier circuit 85. As a result, the same operation result as that of Eq. (20) can be obtained in the accumulator 88.

Figures 23, 24:
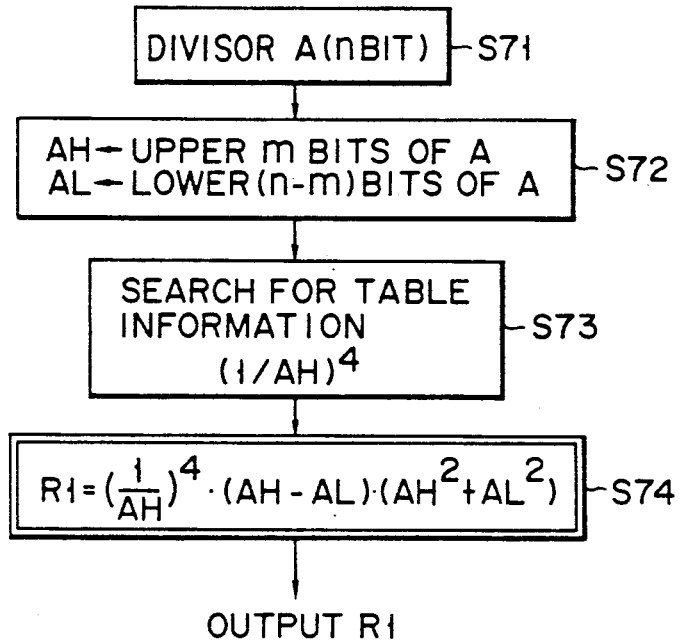
FIG. 23 is a flowchart showing the operation of the reciprocal arithmetic circuit shown in FIG. 22.
FIG. 24 is a diagram showing the relation between the number of bits of the divisor A and the ROM size in the reciprocal arithmetic circuit shown in FIG. 22.

FIG. 24 shows the relation between the bit number n of the divisor A and the bit number m of the upper-bit data AH, and in the fifth embodiment, AH=2 bits when n=8 bits, for example. That is, in the fifth embodiment, it becomes possible to reduce the number of bits to be input to the ROM table in comparison with the approximation calculation process using the full-bit method and Newton's method mentioned before, thereby making it possible to reduce the memory capacity of the ROM table.

As is clearly understood by comparing FIGS. 21 and 24, the memory capacity of the ROM table for generating $(1/AH)^4$ can be made smaller than that of the ROM table for generating $(1/AH)^3$. This is because the converting precision of the approximate calculation shown in Eq. (20) is higher than that of the approximate calculation shown in Eq. (19) $(1/AH)^3$.

As described above, according to this invention, a reciprocal arithmetic circuit in which the hardware can be made simple and whose operation speed and operation precision are enhanced can be obtained.

What is claimed is:

1. A reciprocal arithmetic circuit comprising:
   first memory means, including a conversion table, for storing approximate information items corresponding to the reciprocals of the squares of upper-bit data AH of divisors, for converting the upper-bit data AH of a predetermined divisor A supplied as an address to the first memory means into an approximation of the squared reciprocal $(1/AH)^2$ of the upper-bit data AH of divisor A, and for outputting the approximation;
   subtracter means for deriving a difference between the upper-bit data AH and lower-bit data AL of the divisor A (AH−AL); and
   multiple means connected to receive an output of said first memory means and an output of said subtracter means, for deriving the product $(1/AH)^2 \cdot (AH-AL)$ to make the output of said first memory means more nearly equal to the reciprocal 1/A of the divisor A.

2. A reciprocal arithmetic circuit according to claim 1, wherein said first memory means comprises a read only memory ROM.

3. A reciprocal arithmetic circuit according to claim 1, further comprising second memory means, including an error occurrence range storing table, for storing error occurrence range of the lower-bit data AL corresponding to respective upper-bit data AH and outputting the error occurrence range of the lower-bit data AL corresponding to the upper-bit data AH when the upper-bit data AH is supplied to the second memory means as an address, an error component which is included in the approximation output from said first memory means being larger than a predetermined value in each of the error occurrence ranges; and correction means for determining whether or not the lower-bit data AL of the divisor A lies in the error occurrence range of the lower-bit data AL output from said second memory means and correcting the output of said multiplier means upon detecting that the lower-bit data AL of the divisor A lies in the error occurrence range.

4. A reciprocal arithmetic circuit according to claim 1, wherein said divisor A is n-bit data, and said upper-bit data AH is m-bit data, the bit number m of the upper-bit data AH being set to be equal to or larger than one-half of the bit number n of the divisor A.

5. A reciprocal arithmetic circuit comprising:
   first memory means, including conversion table means, for storing approximation information of reciprocals of upper-mbit data AH of divisors, for converting the upper-mbit data AH of a predetermined divisor A into a first reciprocal 1/AH and a second reciprocal $$\frac{1}{AH + (\frac{1}{2})^m}$$

when the upper-mbit data is supplied to said first memory means as an address, and for outputting the first reciprocal 1/AH and the second reciprocal $$\frac{1}{AH + (\frac{1}{2})^m};$$

and
   approximate calculation means for proportionally dividing a line connecting the first reciprocal 1/AH and the second reciprocal $$\frac{1}{AH + (\frac{1}{2})^m},$$

based on the lower-bit data AL of the divisor A, to make the first reciprocal 1/AH output from said first memory means more nearly equal to the reciprocal 1/A of the divisor A.

6. A reciprocal arithmetic circuit according to claim 5, wherein said first memory means comprises a read only memory ROM.

7. A reciprocal arithmetic circuit according to claim 5, wherein said approximate calculation means effects an operation of $(1/AH) + 2^m \cdot AL$ $$\left\{ \frac{1}{AH + (\frac{1}{2})^m} - 1/AH \right\}$$

when the bit number of the upper-bit data AH is m.

8. A reciprocal arithmetic circuit according to claim 7, wherein said approximate calculation means includes subtracter means for deriving a difference between the second reciprocal $$\frac{1}{AH + (\frac{1}{2})^m}$$

and the first reciprocal 1/AH; multiplier means having a first input terminal supplied with an output of said subtracter means and a second input terminal supplied with the lower-bit data AL of the divisor A shifted by m bits in an upper digit direction, for multiplying the data received at the first and second input terminals by each other; and adding means for adding together an output of said multiplier means and the first reciprocal 1/AH.

9. A reciprocal arithmetic circuit according to claim 5, wherein said approximate calculation means effects an operation of $(1/AH) \cdot (1 - 2^m \cdot AL) + 2^m \cdot AL$.

$$\frac{1}{AH + (\frac{1}{2})^m}$$

when the bit number of the upper-bit data AH is m.

10. A reciprocal arithmetic circuit according to claim 5, further comprising second memory means, including an error occurrence range storing table, for storing error occurrence ranges of the lower-bit data AL corresponding to the respective upper-bit data AH and for outputting the error occurrence range of the lower-bit data AL corresponding to the upper-bit data AH when the upper-bit data AH is supplied to the second memory means as an address, an error component which is included in the approximation output from said first memory means being larger than a predetermined value in each of the error occurrence ranges; and correction means for determining whether or not the lower-bit data AL of the divisor A lies in the error occurrence range of the lower-bit data AL output from said error occurrence range storing table and correcting the output of said approximation calculation means upon detecting that the lower-bit data AL of the divisor A lies in the error occurrence range.

11. A reciprocal arithmetic circuit comprising:

memory means, including a conversion table, for storing approximate information items corresponding to the reciprocals of the cubes of upper-bit data AH of divisors, for converting the upper-bit data AH of a predetermined divisor A supplied as an address to the memory means into the approximation of the cube of the reciprocal thereof $(1/AH)^3$, and outputting the approximation;

pre-processing means for effecting a calculation of $(AH^2 - AH \cdot AL + AL^2)$ based on the upper-bit data AH and lower-bit data AL of the divisor A; and approximation calculation means for multiplying an output of said memory means by an output of said preprocessing means, to make the output $(1/AH)^3$ of said memory means more nearly equal to the reciprocal $1/A$ of the divisor A.

12. A reciprocal circuit comprising:

memory means, including a conversion table, for storing approximate information items corresponding to the reciprocals of upper-bit data of divisors to the fourth power, for converting the upper-bit data AH of a predetermined divisor A supplied as an address to the memory means into an approximation of the reciprocal of AH to the fourth power $(1/AH)^4$, and for outputting the approximation;

pre-processing means for effecting a calculation of $(AH - AL) \cdot (AH^2 + AL^2)$ based on the upper-bit data AH and lower-bit data AL of the divisor A; and approximation calculation means for multiplying an output of said memory means by an output of said preprocessing means, to make the output $(1/AH)^4$ of said memory means more nearly equal to the reciprocal $1/A$ of the divisor A.

* * * * *